(12) United States Patent
Gamble et al.

(10) Patent No.: US 11,348,491 B2
(45) Date of Patent: May 31, 2022

(54) ILLUMINATED SIGNS FOR VEHICLES, MOUNTING SYSTEMS THEREFOR AND RELATED METHODS

(71) Applicant: SMARTREND MANUFACTURING GROUP (SMG), INC., Winnipeg (CA)

(72) Inventors: Nick Gamble, Winnipeg (CA); Michael Yudelevich, Winnipeg (CA); David Beernaert, Winnipeg (CA); Kevin Smith, Winnipeg (CA)

(73) Assignee: SMARTREND MANUFACTURING GROUP (SMG), INC., Winnipeg (CA)

( * ) Notice: Subject to any disclaimer, the term of this patent is extended or adjusted under 35 U.S.C. 154(b) by 0 days.

(21) Appl. No.: 17/394,814

(22) Filed: Aug. 5, 2021

(65) Prior Publication Data

US 2021/0366321 A1 Nov. 25, 2021

Related U.S. Application Data

(62) Division of application No. 16/289,818, filed on Mar. 1, 2019, now Pat. No. 11,170,673.
(Continued)

(51) Int. Cl.
*G09F 13/18* (2006.01)
*G09F 13/04* (2006.01)
(Continued)

(52) U.S. Cl.
CPC ........... *G09F 13/18* (2013.01); *B60Q 1/2696* (2013.01); *B60Q 1/503* (2013.01); *G09F 13/005* (2013.01);
(Continued)

(58) Field of Classification Search
CPC ............. G09F 13/18; G09F 2013/1804; G09F 2013/1809; G09F 13/0413; G09F 13/08;
(Continued)

(56) References Cited

U.S. PATENT DOCUMENTS 2,130,090 A 9/1938 Imhofe
2,877,584 A 3/1959 Dupree
(Continued)

FOREIGN PATENT DOCUMENTS

CN 207624341 U 7/2018
JP 2011081244 A 4/2011
(Continued)

OTHER PUBLICATIONS

"Led Sign Light Bulbs" [online] [retrieved May 29, 2019], Retrieved from the internet: <https://www.newyorkbussales.com/wp-content/uploads/2016/04/16-0405-1_led_sign_lights.pdf> (2015) pp. 1-5.
(Continued)

*Primary Examiner* — Gary C Hoge
(74) *Attorney, Agent, or Firm* — Alston & Bird LLP

(57) ABSTRACT

A self-contained illuminated sign for mounting on a vehicle is disclosed. The sign includes a front panel, a rear panel situated opposite and substantially parallel to the front panel in spaced relation therefrom to define a space therebetween, and a light source comprising a plurality of LEDs. The light source is positioned between the front and rear panels and is configured to emit light that emanates from the front panel. The front panel is thus backlit to display indicia. A system for supporting a self-contained illuminated sign on a vehicle is also disclosed. The system includes the sign and a separate mounting frame mountable on a vehicle. The mounting frame is configured to removably receive the sign and, when the sign is received in the mounting frame, to surround a perimeter of the sign while permitting visibility of the front display area. Related methods are also disclosed.

14 Claims, 35 Drawing Sheets

Related U.S. Application Data

(60) Provisional application No. 62/637,173, filed on Mar. 1, 2018, provisional application No. 62/756,882, filed on Nov. 7, 2018.

(51) Int. Cl.
*G09F 13/08* (2006.01)
*G09F 13/14* (2006.01)
*G09F 13/00* (2006.01)
*G09F 21/04* (2006.01)
*B60Q 1/26* (2006.01)
*B60Q 1/50* (2006.01)
*G09F 13/22* (2006.01)
*G09F 27/00* (2006.01)

(52) U.S. Cl.
CPC .......... *G09F 13/0413* (2013.01); *G09F 13/08* (2013.01); *G09F 13/14* (2013.01); *G09F 21/048* (2013.01); *B60Y 2200/143* (2013.01); *G09F 13/044* (2021.05); *G09F 13/049* (2021.05); *G09F 13/0445* (2021.05); *G09F 27/005* (2013.01); *G09F 2013/1831* (2013.01); *G09F 2013/1854* (2013.01); *G09F 2013/1881* (2013.01); *G09F 2013/222* (2013.01)

(58) Field of Classification Search
CPC ...... G09F 13/14; G09F 21/048; G09F 13/049; G09F 2013/1831; G09F 2013/1854; G09F 2013/222
See application file for complete search history.

(56) References Cited

U.S. PATENT DOCUMENTS

| | | | |
|---|---|---|---|
| 3,593,448 A | 7/1971 | Schoepf | |
| 5,339,550 A * | 8/1994 | Hoffman | B60Q 1/503 40/544 |
| 5,692,327 A * | 12/1997 | Wynne | B60Q 1/56 40/205 |
| 6,050,013 A | 4/2000 | Heaton | |
| 6,698,118 B2 * | 3/2004 | Tietze | B60R 13/10 40/204 |
| D516,125 S | 2/2006 | Fincher | |
| D712,968 S | 9/2014 | Gorelick et al. | |
| D776,202 S | 1/2017 | Zenoff | |
| 9,738,225 B1 * | 8/2017 | Au | B60Q 1/503 |
| 2003/0037472 A1 * | 2/2003 | Nolan | G09F 13/04 40/574 |
| 2008/0295371 A1 * | 12/2008 | Hsu | G09F 13/06 40/570 |
| 2009/0025264 A1 * | 1/2009 | Daimon | G02B 6/0051 40/546 |
| 2009/0033481 A1 * | 2/2009 | Kuvantrarai | B60Q 1/503 340/479 |
| 2010/0043264 A1 | 2/2010 | Johnson, Jr. | |
| 2010/0118403 A1 * | 5/2010 | Laitinen | G02B 6/0076 359/567 |
| 2010/0307041 A1 * | 12/2010 | Tian | G09F 13/22 40/575 |
| 2011/0069512 A1 * | 3/2011 | Horst | G02B 6/0021 362/613 |
| 2011/0167690 A1 * | 7/2011 | Bjarnason | G09F 13/18 40/582 |
| 2012/0036750 A1 * | 2/2012 | Ryul | G09F 13/18 40/546 |
| 2012/0182759 A1 * | 7/2012 | Kokusho | G02B 6/0086 362/602 |
| 2012/0224259 A1 | 9/2012 | Choi | |
| 2012/0260546 A1 * | 10/2012 | Hu | G09F 13/22 40/582 |
| 2013/0088889 A1 * | 4/2013 | Kim | G09F 13/18 362/602 |
| 2014/0208626 A1 | 7/2014 | Moon | |
| 2015/0068076 A1 * | 3/2015 | Knapschaefer | G09F 21/048 40/209 |
| 2015/0309248 A1 * | 10/2015 | Xu | G02B 6/006 362/607 |
| 2015/0353031 A1 | 12/2015 | Cairo | |
| 2017/0032717 A1 * | 2/2017 | Michaelidis | F21V 19/003 |
| 2017/0036594 A1 | 2/2017 | Roberts et al. | |
| 2017/0101047 A1 | 4/2017 | Dellock et al. | |
| 2017/0203686 A1 | 7/2017 | Salter et al. | |
| 2018/0037156 A1 * | 2/2018 | Stevens | F21S 43/26 |
| 2018/0074251 A1 * | 3/2018 | Berard | B60Q 3/43 |

FOREIGN PATENT DOCUMENTS

| | | |
|---|---|---|
| WO | WO 2002/028670 A2 | 4/2002 |
| WO | WO 2015/101664 A1 | 7/2015 |
| WO | WO 2017/180900 A1 | 10/2017 |

OTHER PUBLICATIONS

"Can you Keep a Secret? Here it is: 'School Bus Drivers Can't See in the Dark'", [online] [retrieved May 29, 2019], Retrieved from the internet: <https://www.linkedin.com/pulse/can-you-keep-secret-here-school-bus-drivers-cant-see-dark-decarlo/> (Jan. 8, 2017).

Shackleford, C. "How and When to Buy a Used School Bus" [online] [retrieved May 29, 2019], Retrieved from the internet: <https://www.schoolbusfleet.com/article/610459/how-and-when-to-buy-a-used-school-bus> (Aug. 1, 2017).

Leauby, B. "6 Ways to Address New Overtime Rules", [online] [retrieved May 29, 2019], Retrieved from the internet: <https://www.schoolbusfleet.com/article/717606/6-ways-to-address-new-overtime-rules> (Nov. 9, 2016).

"School Bus Fleet Magazine Forums" [online] [retrieved May 29, 2019], Retrieved from the internet: <https://www.schoolbusfleet.com/forum/topic.asp?TOPIC_ID=7463> (2004).

PCT/CA2019/051498 International Search Report and Written Opinion dated Jan. 20, 2020 (15-pages).

"SoundOff CVP Driver Alert Message Sign" [online], retrieved from the Internet Feb. 24, 2021, <https://youtu.be/k0P1h2AMxnQ> (dated Mar. 22, 2017), 1 page.

\* cited by examiner

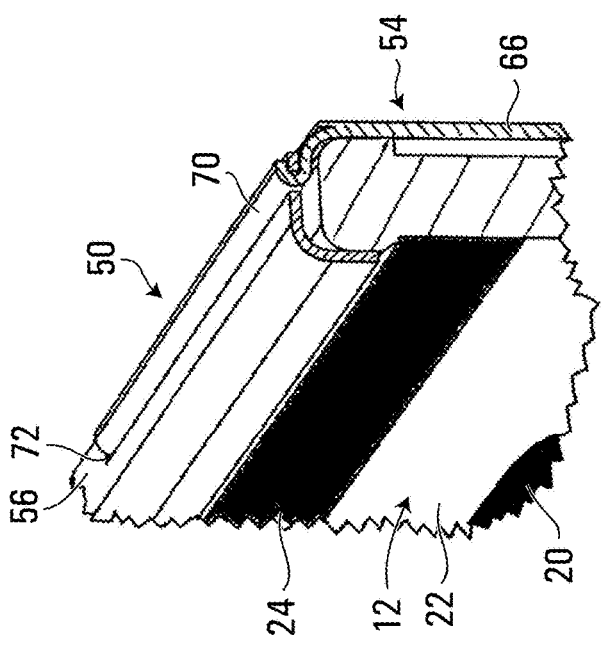
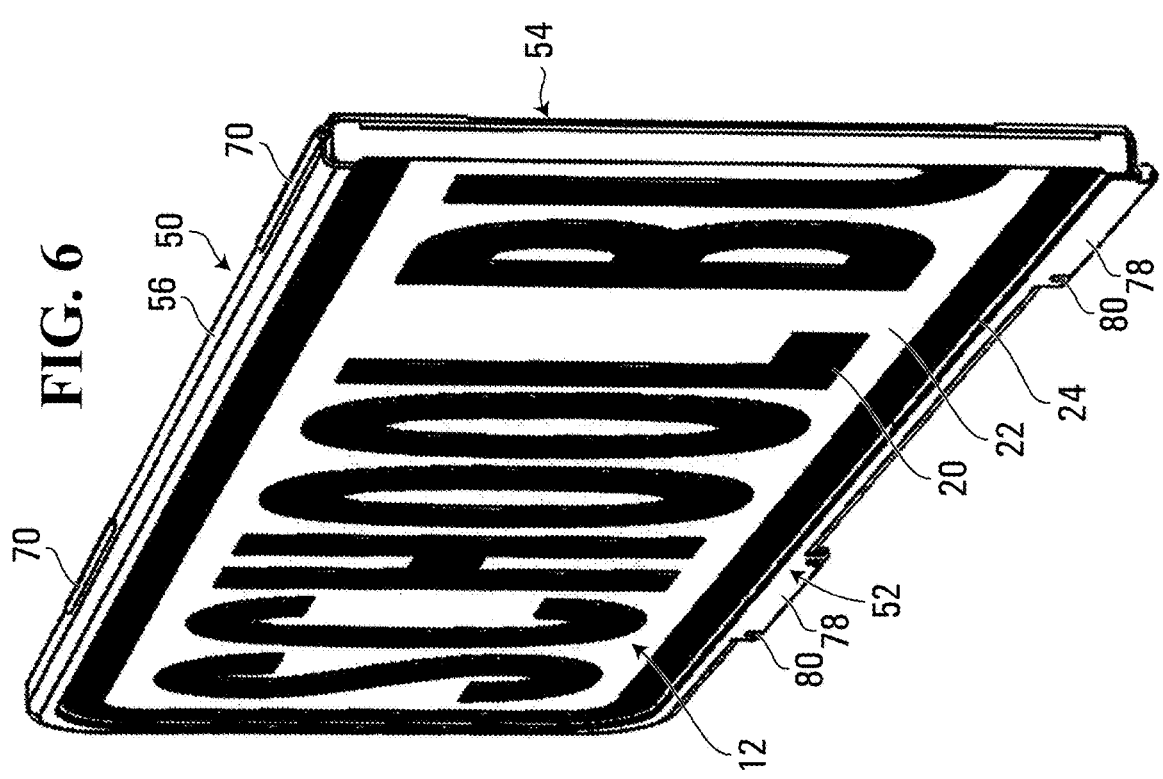

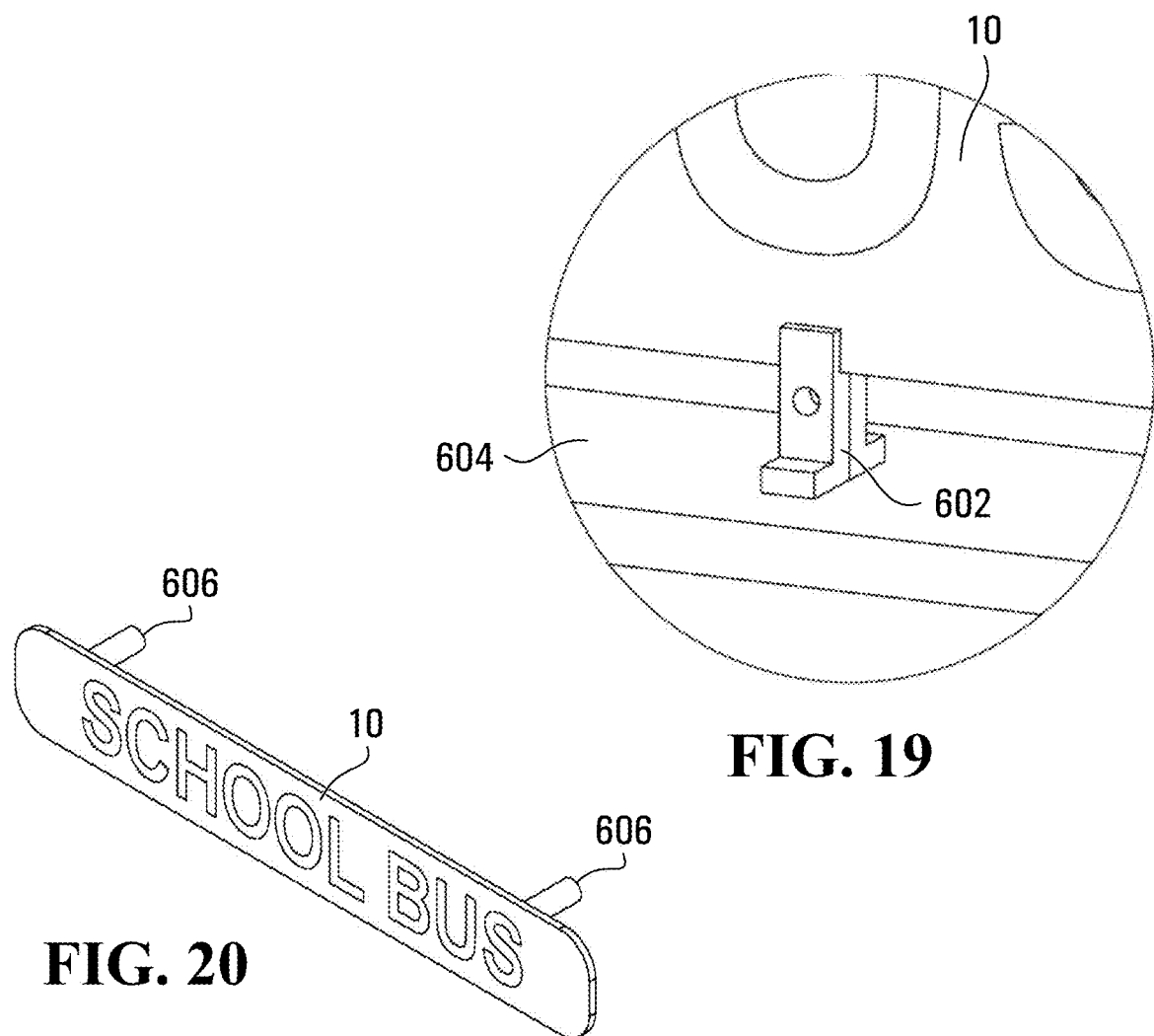
FIG. 19
FIG. 20
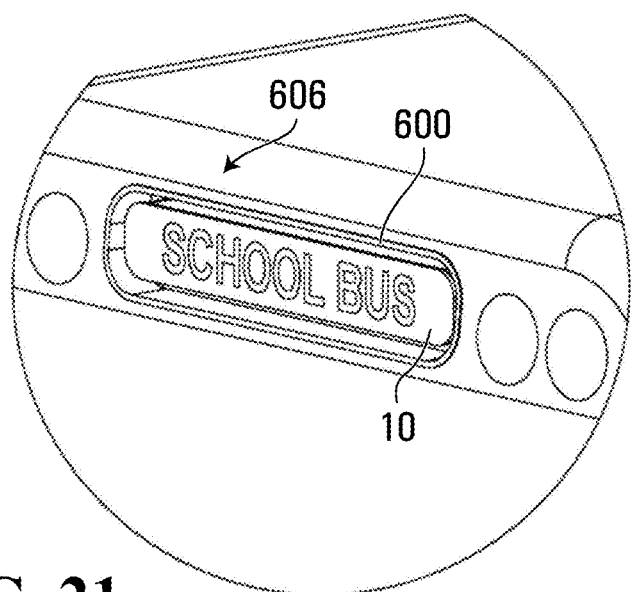
FIG. 21

ILLUMINATED SIGNS FOR VEHICLES, MOUNTING SYSTEMS THEREFOR AND RELATED METHODS

CROSS-REFERENCE TO RELATED APPLICATIONS

The present application is a divisional of U.S. patent application Ser. No. 16/289,818, entitled "ILLUMINATED SIGNS FOR VEHICLES, MOUNTING SYSTEMS THEREFOR AND RELATED METHODS", filed on Mar. 1, 2019, which claims priority from U.S. Patent Application Ser. No. 62/637,173, entitled "SELF-CONTAINED ILLUMINATED SCHOOL BUS SIGNS", filed on Mar. 1, 2018, and U.S. Patent Application Ser. No. 62/756,882, entitled "SELF-CONTAINED ILLUMINATED SCHOOL BUS SIGNS", filed on Nov. 7, 2018, all of which are incorporated herein by reference in their entirety.

FIELD

The present invention relates generally to illuminated signs for mounting to vehicles, such as school buses and other purpose-specific vehicles, mounting systems therefor and related methods.

BACKGROUND

In the interest of optimizing the visual recognition of vehicles, such as school buses, in low light conditions or adverse weather conditions, it has been known to improve the visibility of signage on the vehicles by using a light-reflective backdrop behind black lettering. This solution relies on exposure to external light sources such as street lights or headlights of other vehicles.

Other known solutions require assembly of a hollow compartment with the vehicle structure to accommodate a plurality of incandescent bulbs, along with installation of a glass panel with opaque lettering in a position overlying the bulb-illuminated compartment.

Other known illuminated signs use similar incandescent illumination, for example placing a similar transparent panel with printed indicia at the front of the vehicle over the windshield with a row of incandescent bulbs supported behind the panel on a separate light bar. Another known method of illuminating signs employs a strip of lights mounted externally above or below the lettering on the sign. This method is incapable of providing a notable uniformity of light dispersion throughout the full display area of the sign.

There remains room for improved and alternative solutions in the field of illuminated signage for vehicles.

SUMMARY

In one aspect, there is provided a self-contained illuminated sign for direct or indirect mounting on a vehicle, the sign comprising: a front panel; an opaque rear panel situated opposite and substantially parallel to the front panel in spaced relation therefrom to define a space therebetween; and a light source comprising a plurality of LEDs, the light source being positioned in the space between the front and rear panels and configured to emit light that emanates from the front panel such that, in operation, the front panel is backlit to display indicia.

In another aspect, there is provided a system for supporting a self-contained illuminated sign on a vehicle, the system comprising: a self-contained illuminated sign having: a front display area, and a built-in light source configured to emit light that emanates from the front display area such that, in operation, the front display area displays indicia; and a separate mounting frame mountable on a vehicle for supporting the sign on the vehicle, the mounting frame being configured to removably receive the sign and, when the sign is received in the mounting frame, to surround a perimeter of the sign while permitting visibility of the front display area.

In another aspect, there is provided a self-contained illumination source for an illuminated vehicle sign, the illumination source comprising in stacked relationship: an opaque rear panel; a light dispersion panel affixed to the rear panel; and one or more LED strips positioned in edge lighting relationship with the light dispersion panel.

In another aspect, there is provided an illuminated sign system for a motor vehicle, the system comprising: a self-contained illuminated sign for direct or indirect external mounting on the motor vehicle, the sign having: a front display area, and a built-in light source comprising a plurality of LEDs configured to emit light that emanates from the front display area such that, in operation, the front display area displays indicia; and a power regulator system for providing a desired power to the sign for consistent illumination, the power regulator system being configured to accept fluctuating power from an electrical system of the vehicle and to output the desired power.

BRIEF DESCRIPTION OF THE DRAWINGS

Aspects and embodiment of the invention will now be described in conjunction with the accompanying drawings in which:

FIG. 6 is an isometric cross-sectional view of the sign and mounting frame of FIG. 4 once fully assembled, the sign being shown without cross-sectional detail for illustrative simplicity.

FIG. 7 is an enlarged view of the assembled sign and mounting frame of FIG. 6.

FIG. 19 is a close up view of a portion of FIG. 18.

FIG. 20 is a perspective view of a sign assembly according to one embodiment of the present disclosure.

FIG. 21 is a perspective view of the sign assembly of FIG. 20 installed in a vehicle.

DETAILED DESCRIPTION

The following description describes embodiments according to the present disclosure in detail. It is to be understood that, while many embodiments are described as and show a sign for school buses or other similar activity vehicles, the principles described and disclosed herein may be applicable to a variety of illuminated signs used on vehicles, including, but not limited to, trucks (including ambulances and fire trucks), cars (including taxis), boats, ships, airplanes, etc. Thus, use of the terms bus, "school bus", "school bus sign" and other similar terms are not to be limiting of the scope of the present disclosure.

Figure 1:
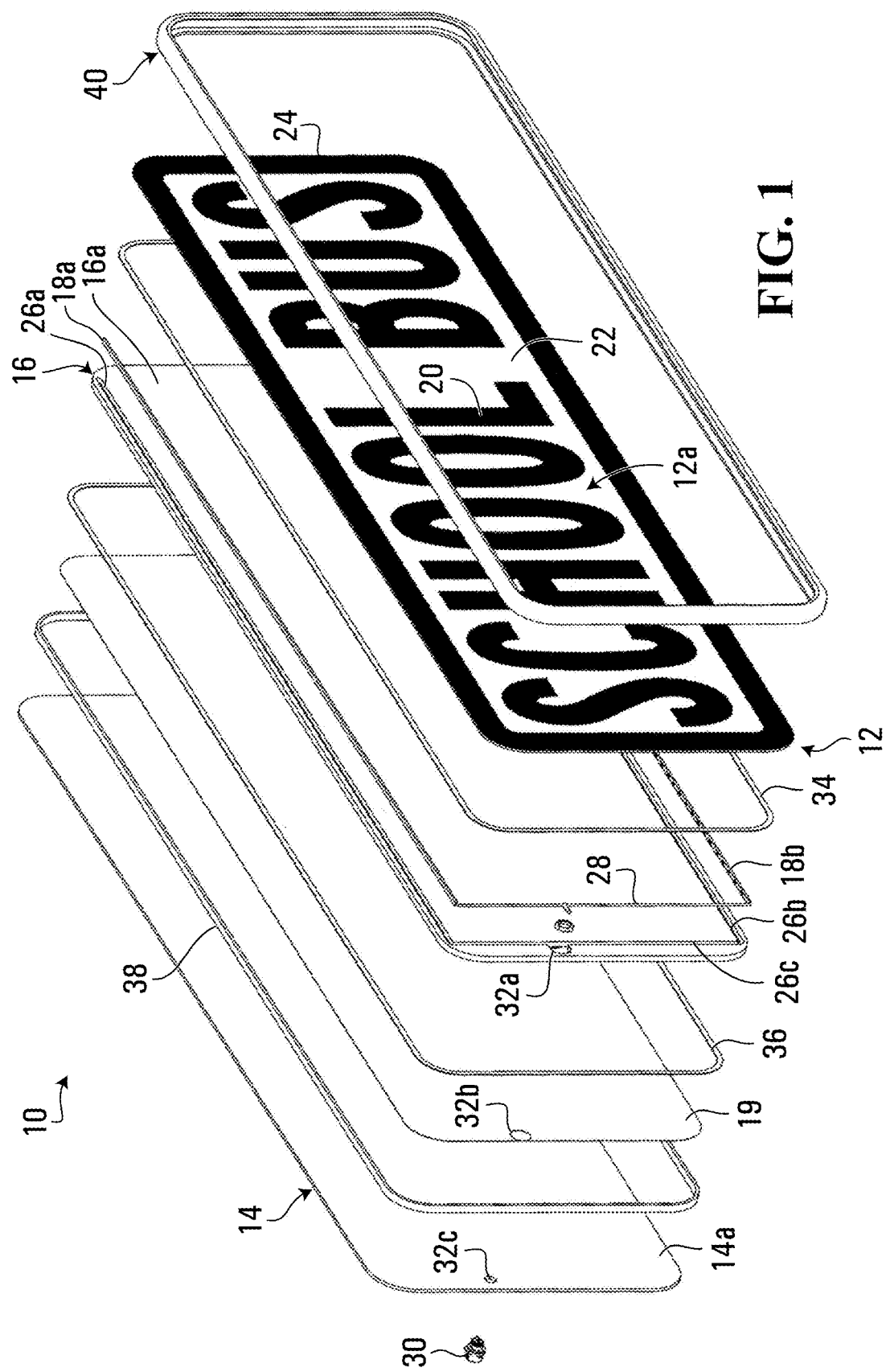
FIG. 1 is an exploded front isometric view of a self-contained illuminated sign according to the present disclosure.
Figure 2:
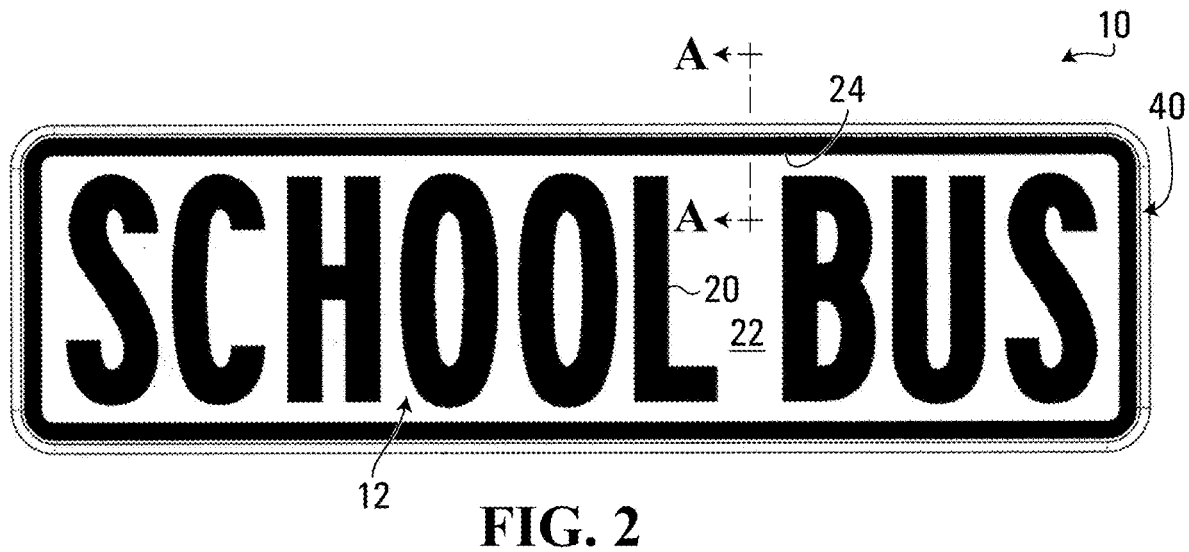
FIG. 2 is an assembled front elevational view of the sign of FIG. 1.
Figure 3:
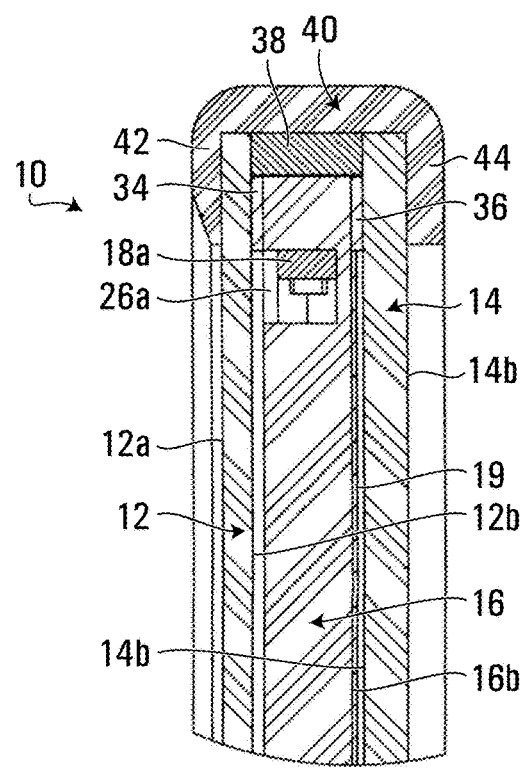
FIG. 3 is a partial cross-sectional view of the sign of FIG. 2 as taken alone line A-A thereof.

FIGS. 1 to 3 illustrate a self-contained illuminated sign according to one embodiment of the present invention, which is usable together with a separate mounting frame described herein further below to enable mounting of the sign 10 to the shell of a vehicle, such as a school bus.

FIG. 1 is an exploded view of the sign illustrating its constituent components, including a front panel 12, an opposing rear panel 14 of similar or equal size and shape to the front panel 12, a light dispersion panel 16 of similar shape and slightly smaller size than the front and rear panels for sandwiched receipt therebetween, LED light strips 18 for illuminating the light dispersion panel 16, and a reflective backing sheet 19 of similar shape and slightly smaller size than the light dispersion panel 16 for placement therebehind and in front of the rear panel 14. Illuminated by the LED light strips 18, the light dispersion panel 16 forms a built-in LED-based light source for backlighting the front panel 12, which includes opaquely masked areas forming blacked-out indicia 20 of appropriate wording for the intended school bus application of the sign.

In the illustrated example, the indicia 20 spell out the words "School Bus". Other examples of indicia that are commonly used on school buses include "Activity Bus", typically denoting a school bus that is used to transport students for extracurricular activities, field trips, sporting events, etc., where the students are loaded and unloaded only at specific start and stop destinations, as opposed to roadside student pickups and drop offs that occur on a daily scheduled school bus route. Another example of suitable sign indicia is "Ecoliers", the French language term used for school bus signage, which generally translates to "Students" or "Schoolchildren". Accordingly, the particular written message conveyed by the indicia may identify the type of vehicle for which the sign is intended (e.g. School Bus, Activity Bus, etc.), or the type passenger for which the vehicle is intended (Ecoliers, etc.). Activity buses are typically of similar overall construction to routed school buses, but differ primarily in the lack of traffic warning equipment associated with road-side pickup and drop-off, such as swing-out stop signs, crossing arms, flashing warning lights, etc. The generic term "School Bus" is thus used herein to encompass both activity buses and warning-equipped school buses. In addition to "Ecoliers", indicia printed in languages other than English and French may of course by applied in different jurisdictions according to local language standards.

In the illustrated embodiment, the opaquely masked indicia 20 are encompassed by a surrounding transparent or translucent area 22 of the display panel, which in turn is surrounded by an opaquely masked border area 24 that blacks out a margin space of the panel around the full perimeter thereof. The transparent/translucent area 22 is tinted in yellow, white or other colour of notable contrast to the black or darkened appearance of the opaquely masked areas, whether by manufacture of the front panel itself in coloured transparent/translucent material or by application of a coloured film or coating material to the panel, whereby illumination of the light dispersion panel 16 behind the front panel 12 will emit light through the coloured transparent/translucent area 22, but not through the blacked-out indicia and margin space at the opaquely masked areas 20, 24, whereby the blacked-out lettering of the indicia 20 is readily visible in low light conditions due to the backlighting of the surrounding colour tinted area 22.

In some embodiments, the opaquely masked areas 20, 24, may be painted with retro-reflective paint or have a retro-reflective label or decal to improve visibility in low light level conditions.

The light dispersion panel 16 of the illustrated embodiment has a set of grooves 26a, 26b, 26c recessed in a front face thereof. In the illustrated example, the grooves run along three perimeter edges of the panel 16, particularly along elongated top and bottom perimeter edges of the panel and one of the two shorter side perimeter edges of the panel. The illustrated embodiment features two LED light strips 18a, 18b. The first light strip 18a resides in the upper groove 26a situated adjacent the top edge of the panel 16, and the second light strip 18b resides in the lower groove 26b situated adjacent the bottom edge of the panel 16. Connection wiring 28 between the two LED light strips 18a, 18b occupies the third groove 26c situated adjacent the side perimeter edge of the panel. The LEDs of each strip face inwardly toward the center of the light dispersion panel 16, away from the respective perimeter edge thereof. The grooves reside closely adjacent the perimeter edges of the panel 16, whereby a substantial majority of the panel's overall area is located inwardly of the grooves. Activation of the LEDs when connected to a suitable power source will thus emit light inwardly away from the adjacent edge of the panel, and thus illuminate the major central area of the panel 16.

While in some embodiments the panel 16 is backlit to display the opaque indicia in contrast with surrounding transparent or translucent areas, in other embodiments the panel 16 is backlit to display illuminated indicia in contrast with surrounding opaque areas.

Mounted inside the grooves near the edges of the panel, the LEDs are placed in edge-lighting relation to the panel 16, but in an embedded manner recessed into the face of the panel 16 itself, thus avoiding the need for an extruded frame or other LED support means spanning externally around the perimeter of the panel 16. The light dispersion panel and its embedded LEDs thus form a frameless, edge-lit backlighting unit for emitting light through the yellow-tinted transparent/translucent area 22 of the front panel 12. Use of an LED edge-lit light dispersion panel 16 to backlight the front panel 12 of the sign may provide improved uniformity of illumination relative to prior art placement of incandescent lights in exposed relation behind the sign indicia, and may eliminate the need for separate means for mounting such large-scale incandescent bulbs behind the indicia-carrying display panel. The blacked-out margin space of the masked border area 24 is wide enough to fully cover the grooves 26a, 26b, 26c in the light dispersion panel 16, and thus conceal the LEDs contained therein from direct exposure through the front panel 12. This way, only the uniformly illuminated central area of the light dispersion panel 16 is visible through the yellow-tinted transparent/translucent area 22 of the front panel 12.

The light dispersion panel 16 and the LEDs embedded therein are fully contained within the space between the front and rear panels 12, 14 of the sign, as best shown in the cross-sectional view of FIG. 3. Turning back to FIG. 1, an electrical routing hole 32a passes through the light dispersion panel 16 from the front face 16a thereof to the opposing rear face 16b thereof at the groove 26c that is occupied by the connection wiring 28. This routing hole 32a accommodates routing of the connection wiring 28, or an electrical connector 30 coupled thereto, rearwardly through the light dispersion panel 16. Aligned electrical routing holes 32b, 32c in the reflective backing sheet 19 and rear panel 14 align with the routing hole 32a in the light dispersion panel 16 to accommodate further routing of the wiring 28 or connector 30 rearwardly out the back of the sign. Outside the sign, the connector 30 can be coupled to a suitable power adapter that will be wired into the electrical system of the school bus on which the sign is eventually installed in order to provide suitable operating voltage for the LED strips.

To assemble the sign of the illustrated embodiment, first strips 34 of double sided adhesive tape are applied to the front face 16a of the light dispersion panel 16, or the rear face 12b of the front panel 12, in positions lying along and closely adjacent all perimeter edges of this panel. The first strips 34 of tape are placed close enough to the perimeter of the panels 12, 16 to reside in the margin space between the grooves 26a, 26b, 26c of the light dispersion panel 16 and the perimeter edges thereof. With the LED strips 18a, 18b and the connection wiring 28 received in the respective grooves 26a, 26b, 26c of the light dispersion panel 16, the rear face 12b of the front panel 12 and front face 16a of the light dispersion panel are pressed together to achieve adhesive coupling via the adhesive tape 34. Likewise, second strips 36 of double sided adhesive tape are applied to the front face 14a of the rear panel 14 panel, or the rear face 16b of the light dispersion panel 16, in positions lying along and closely adjacent all perimeter edges of this panel. The front face 14a of the rear panel 14 and rear face 16b of the light dispersion panel 16 are pressed together to achieve adhered coupling therebetween via the adhesive tape 36. In the illustrative embodiment, the adhesive strips are positioned around perimeters of the panels to help ensure uniform adhesions and spacing between the panels.

With reference to FIG. 3, the reflective backing sheet 19 between the light dispersion panel 16 and the rear panel 14 may be smaller than both of these panels in order to fit within the area bound by the second strips 36 of adhesive tape. This way, in the illustrated embodiment, the light dispersion panel 16 and rear panel 14 are directly coupled together by the adhesive tape 36 therebetween, not via the reflective backing sheet 19. An adhesive sealing strip 38 is wrapped around the perimeter of the light dispersion panel 16 that is now adhesively secured in the space between the front and rear panels 12, 14. The sealing strip 38 has a width spanning the full distance between the rear face of the front panel 12 and the front face 14a of the rear panel 14 in order to effectively seal the internal space of the sign in which the edge-lit LED backlighting unit is contained. This aids in preventing exposure of the LEDs and associated wiring to the elements (rainwater, melted snow, etc.).

A secondary outer seal 40 is placed over the sealing strip 38 and embraces externally over the front and rear panels 12, 14 and the interior space therebetween in resiliently stretched relation around the entire perimeter of the front and rear panels. The outer seal 40 has a channel-shaped cross-section with a front lip 42 embracing externally over the front face 12a of the front panel 12 in fluid-tight sealed relation therewith, and a rear lip 44 embracing externally over the rear face 14b of the rear panel 14 in fluid-tight sealed relation therewith. The external fitting of the outer seal over the front and rear panels 12, 14 aids in providing improved weather-tight sealing of the sign's internal space relative to use of the inner sealing strip 38 alone.

In some embodiments, the weather-tight seal spans a perimeter of the sign and embraces internally the front and rear panels from a front face of the rear panel to a rear face of the front panel.

The overall sign construction in the illustrated embodiment is frameless, as there is no metal or rigid plastic extrusion or framework assembled around the perimeter of the assembled panels 12, 14, 16, which are instead adhesively interconnected in a sandwiched assembly, and optionally further held in this assembled state by the flexible outer seal 40 whose channel-sectioned shape further prevents separation of the adhesively sandwiched panels.

Figure 4:
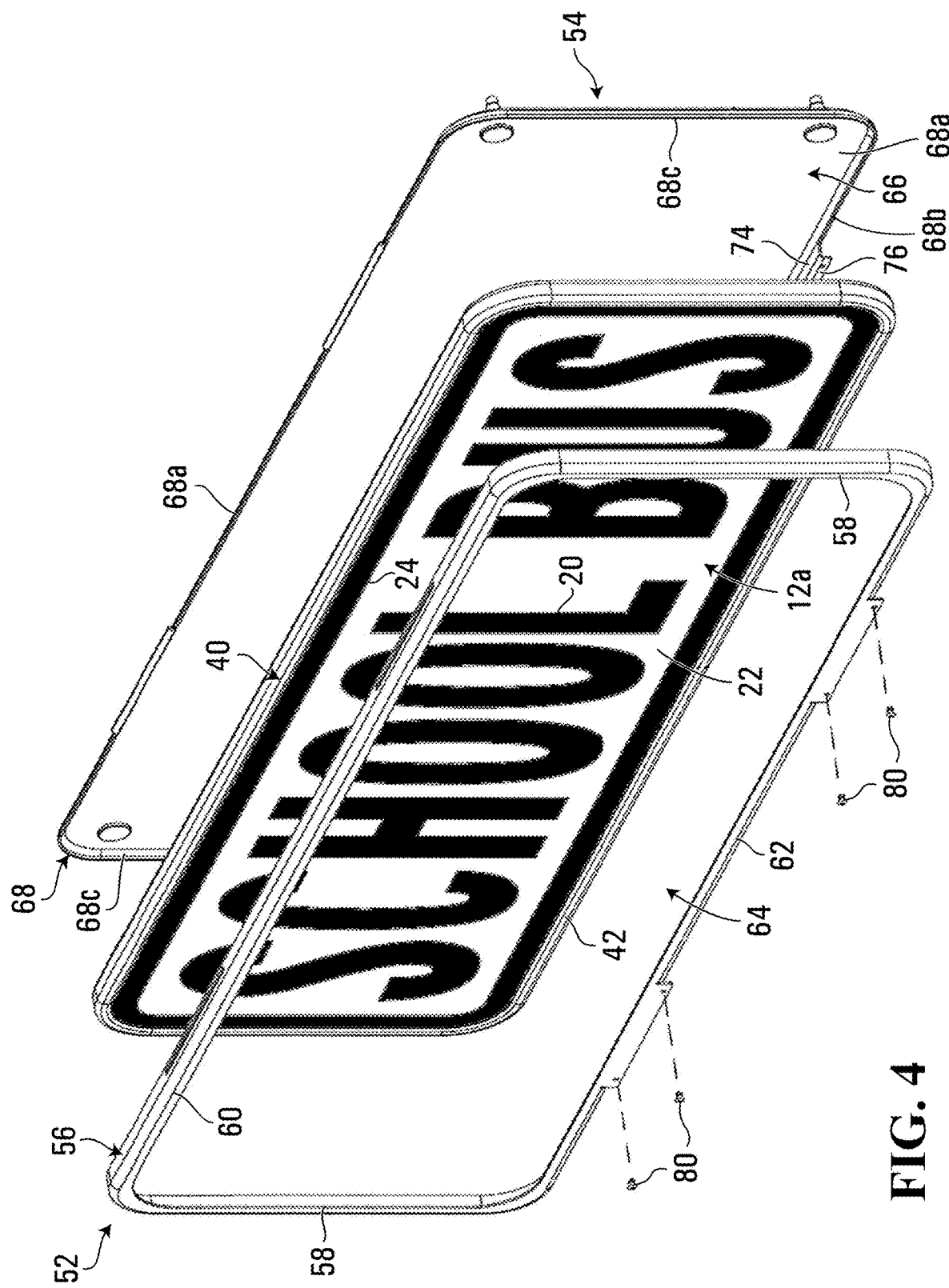
FIG. 4 is an isometric front view of the sign of FIG. 2 during placement thereof within a separate mounting frame, which is shown in an exploded state.
Figure 5:
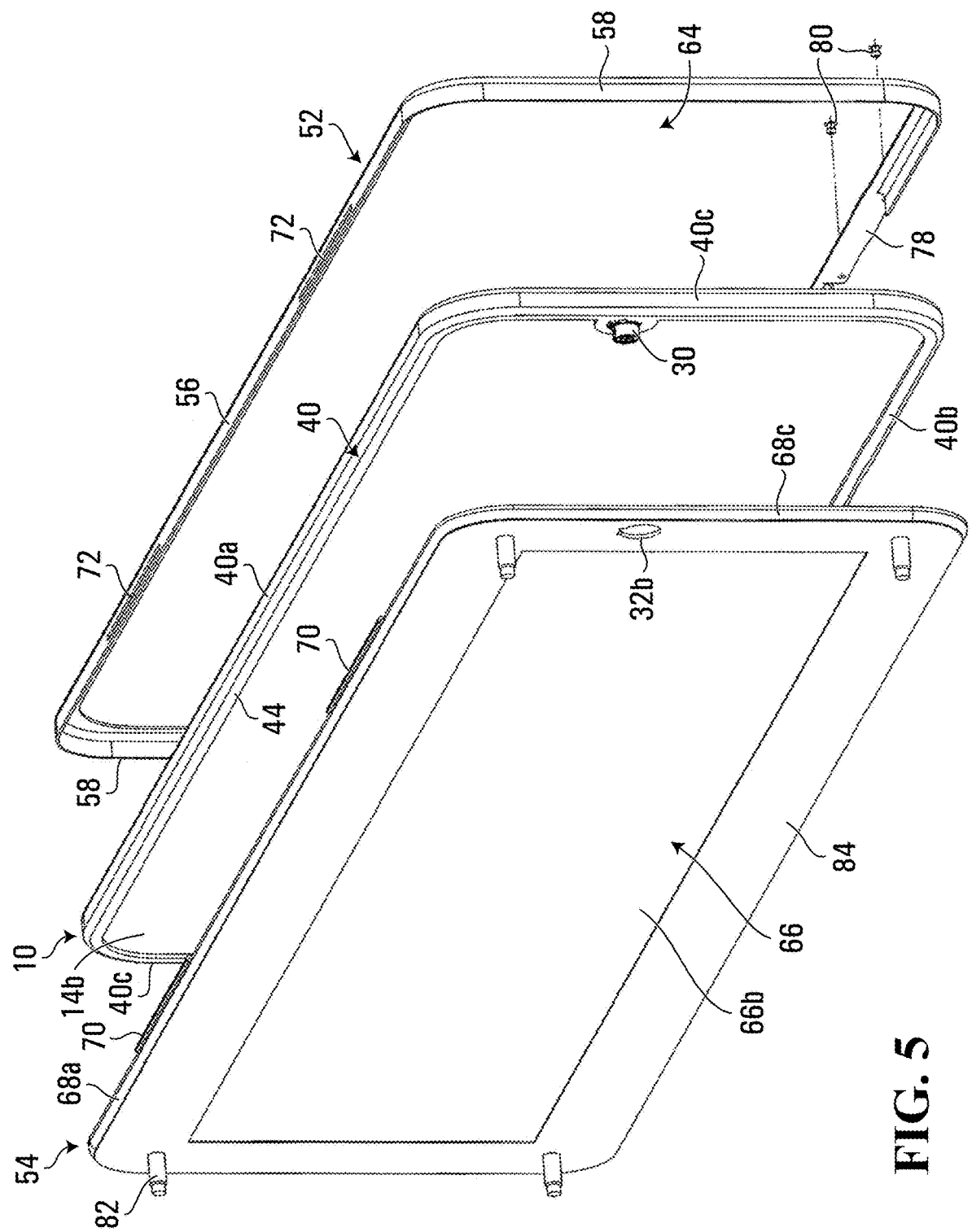
FIG. 5 is an isometric rear view of the sign and mounting frame of FIG. 4.

To support the frameless sign 10 on a school bus, a separate mounting frame 50 is thus provided. With reference to FIGS. 4 to 6, the mounting frame 50 has a two-piece construction featuring a front sub-frame 52 and a cooperating rear sub-frame 54. When mated together, these sub-frames cooperatively form an internal space in which the frameless sign 10 is installed to enable indirect support of the sign 10 on the shell of a school bus by attachment of the mounting frame 50 thereto.

In the illustrated embodiment, the front sub-frame 52 has a skeletal structure 56 that is shaped to generally conform with the perimeter shape of the sign 10. The skeletal structure 56 has two upright side members 58 that are joined together at their top and bottom ends by an upper cross-member 60 and a lower cross-member 62, respectively. In the illustrated embodiment, where the sign 10 is of generally rectangular shape with parallel top and bottom edges and parallel side edges, the two upright sides 58 of the skeletal structure 56 are likewise parallel with one another, as are the upper and lower cross-members 60, 62. This skeletal structure of generally linear members in parallel pairs imparts a generally rectangular shape to the front sub-frame 52.

However, in other embodiments, the perimeter shape of the sign, and thus the confirming perimeter shape of the front and rear sub frames of the mounting frame, may vary, for example to adopt application-specific shapes dictated by available signage areas on the particular model of school bus concerned. The sides and cross-members of the front sub-frame 52 therefore need not be of linear span, nor parallel with one another. Thus, it will be understood that a variety of possible shapes for frame 50 are within the present disclosure and that the frame 50 may be constructed to accommodate various shapes, size, dimensions, orientations and other attributes of the sign 10.

Moreover, in some embodiments, the skeletal structure 56 may be comprised of more individual components that have been fastened to each other or otherwise connected. For example, the skeletal structure may be made of top and bottom horizontal pieces, right and left-side vertical pieces, and corner pieces used to connect the vertical and horizontal pieces to form the skeletal structure 56.

Regardless of their particular shape and relative orientations, the members of the skeletal structure cooperatively delimit an open window space 64 through which the front face 12a of the front panel 12 of the sign 10 is visible when installed inside the mounting frame. In the illustrated embodiment, the skeletal structure of the front sub-frame 52 is relatively thin so as not to notably obstruct the front panel of the sign. The open window space 64 of the front sub-frame 52 thus occupies a substantial majority of its overall area.

The rear sub-frame 54 is not skeletal in structure, and instead features a solid backing plate 66 of generally conforming shape to the perimeter shape of the sign. A rim 68 projects forwardly from the front side of the backing plate 66 around the full perimeter thereof. The upper cross-member 60 and sides 58 of the front sub-frame 52 each have a generally L-shaped cross-section with an inwardly reaching leg jutting inwardly toward the open window space 64, and a rearwardly reaching leg jutting rearwardly toward the plane of the rear sub-frame's backing plate 66. The upper rim 68a spanning the topside of the rear sub-frame features a pair of hooked catch tabs 70, each situated near a respective end of the upper rim 68a. The rearward leg of the upper cross-member 60 of the front sub-frame 52 features a pair of slots 72 therein at positions aligned with the hooked catch tabs 70 of the rear sub-frame 54.

With reference to the upper half of FIG. 7, the two sub-frames 52, 54 are pivotably coupled together by engagement of each hooked catch tab 70 in the respective slot 72, where the catch tab 70 hooks around the rear edge of the slot 72 to create a hinge-joint whose horizontal pivot axis lies along this rear edge of the slot. When the two sub-frames 52, 54 are initially assembled in this manner, two sub-frames can thus be pivoted relative to one another between an open position in which the lower cross-member 62 of the front sub-frame 52 is swung away from the lower rim 68b of the rear sub-frame 54 to open up access to the interior space for placement of the sign 10 therein, and a closed position in which the lower cross-member 62 of the front sub-frame 52 and the lower rim 68b of the rear sub-frame 54 are brought together to enclose the inserted sign 10 between the inwardly reaching legs of the front sub-frame's skeletal members and the backing plate 66 of the rear sub-frame.

It will be appreciated that forwardly hooked catch tabs may alternatively be placed on the front sub-frame for mating with cooperative slots on the rear sub-frame to achieve a similar hinged connection by which the mounting frame can open or close in this clam-shell style. It will also be appreciated that other means for a pivotal connection may be employed, for example including use of separate hinge hardware rather than integrally formed slot and catch features on the sub-frames that cooperatively form an effective hinge joint therebetween.

The bottom rim 68b of the rear sub-frame 54 features a pair of forwardly-reaching extensions 74 positioned near the opposite ends of the bottom rim 68b, for example in alignment with the hooked catch tabs 70 at the upper rim 68a. Each extension 74 terminates in a down-turned fastening flange 76 at the distal end of the extension furthest from the backing plate 66. The bottom cross-member 62 of the front sub-frame 52 features an L-shaped cross-section, like those of the upper cross-member 60 and side members 58, over most of the lower cross-member's length, with the exception of two extended fastening flanges 78 that are situated near the ends of the lower cross member 62 in alignment with the down-turned fastening flanges 76 of the rear sub-frame 54. The extended fastening flanges 78 of the front sub-frame 52 are coplanar with the inwardly reaching leg of the lower cross-member's otherwise L-shaped cross-section, but extend further downward than the rest of the lower cross-member 62. When the clam-shell mounting frame 50 is closed, the extended fastening flanges 78 of the front sub-frame 52 abut against the down-turned fastening flanges 76 of the rear sub-frame 54. Accordingly, once the sign 10 has been placed inside the open mounting frame, the mounting frame is then closed, and the front and rear sub-frames are fastened together at the cooperating fastening flanges 76, 78 to lock the mounting frame in the closed position securing the sign within the interior space thereof.

Some internal dimensions of the mounting frame slightly exceed the corresponding external dimensions of the sign 10. The internal dimensions of the mounting frame include an internal height of the mounting frame measured either between the top and bottom rims 68a, 68b of the rear sub-frame 54, or between the rearwardly reaching legs of the upper and lower cross-members 60, 62 of the front sub-frame's skeletal structure; an internal width of the mounting frame measured between the side rims 68c of the rear sub-frame, or between the rearwardly reaching legs of the side members 58 of the front sub-frame's skeletal structure; and an internal depth measured between the backing plate 66 of the rear sub-frame 54 and the inwardly reaching legs of the skeletal structure members at the plane of the window opening 64 in the front sub-frame 52. The internal height and width of the mounting frame exceed the corresponding external dimensions of the sign 10, namely the external sign height measured from the topside of the outer seal's upper span 40a at to the top of the sign to the underside of the outer seal's lower span 40b at the bottom of the sign 10; and the external sign width measured from between the outer surfaces 40c of the outer seal 40 at the opposite sides of the sign 10. the sign also has external thickness measured from the outer surface of the outer seal's front lip 42 to the outer surface of the outer seal's rear lip 44. However, since the thickness is notably smaller than the height and width dimensions, it is less subject to significant thermal shrinkage and expansion in cold and hot temperatures. Accordingly, the internal depth of the mounting frame need not necessarily exceed the sign thickness, and alternatively may be equal to or slightly less than the sign thickness to provide a conforming fit or slight interference fit in this dimension.

The sign is safely retained within the mounting frame by the rear sub-frame's rim 68 and the front sub-frame's rearwardly reaching legs, which collectively span across the sides, top and bottom of the sign 10 to block the sign from sliding upwardly, downwardly or laterally out from the mounting frame, and also by the inwardly reaching legs of the front sub-frame that reach inwardly over the front lip 42 of the sign's outer seal 40 to cooperate with the backing plate 66 of the rear subframe that lies behind the sign's rear panel 14 in order to block the sign from falling forwardly or rearwardly out of the mounting frame. As described above, the depth of the frame may be dimensioned for a conforming or interference fit with the sign in order to hold the sign relatively firmly therein, while the oversized height and length of the frame leave some open space around the frame. This way, the mounting frame 50 can be made of the same steel or other metal material as the bus shell and be rigidly mounted thereto, while plastic materials used in the construction of the sign 10 itself can undergo thermal expansion and contraction in the height and width directions at different rates than the steel used in the mounting frame and bus shell.

Rivets 80 may be used to fasten the front and rear sub-frames together at the fastening flanges 76, 78 once the mounting frame has been closed with a sign 10 placed therein. While threaded fasteners could alternatively be used, rivets provide the advantage of not coming loose under vibrational loads. To attach the mounting frame to the bus shell, the rear sub-frame 54 features a set of threaded mounting studs 82 projecting from the backside of the backing plate 66, for example a set of four such studs 82 situated near the four corners of the backing plate 66. A set of mounting holes are drilled or otherwise formed in the shell of the bus in matching layout to the mounting studs 82. A resiliently compressible gasket or bulb seal 84 is applied to the backside 66b of the backing plate 66, which forms a mounting surface placed against the shell of the bus during installation of the mounting frame thereon.

The backing plate 66 includes an additional routing hole 32d therein that aligns with those of the sign 10 to allow routing of the LED wiring 28 or connector 30 rearwardly through the backing plate 66 from the interior space of the mounting frame and onward through a drilled or otherwise formed routing hole in the bus shell. This routing of the wiring 28 or connector 30 enables connections of the sign's LEDs to the bus's electrical system via a suitable power adapter mounted inside the bus shell. As shown in FIG. 5, the gasket spans at least around the perimeter of the backing plate 66, including areas around the mounting studs 82 and the electrical routing hole 32d. This prevents leakage of rain water or melted snow into the interior of the bus via the mounting holes, electrical routing hole or other openings in the bus shell that may be present behind the mounting frame. The gasket also provides vibration dampening to the installed mounting frame and the sign contained therein. When the sign 10 is placed inside the mounting frame.

Figure 8:
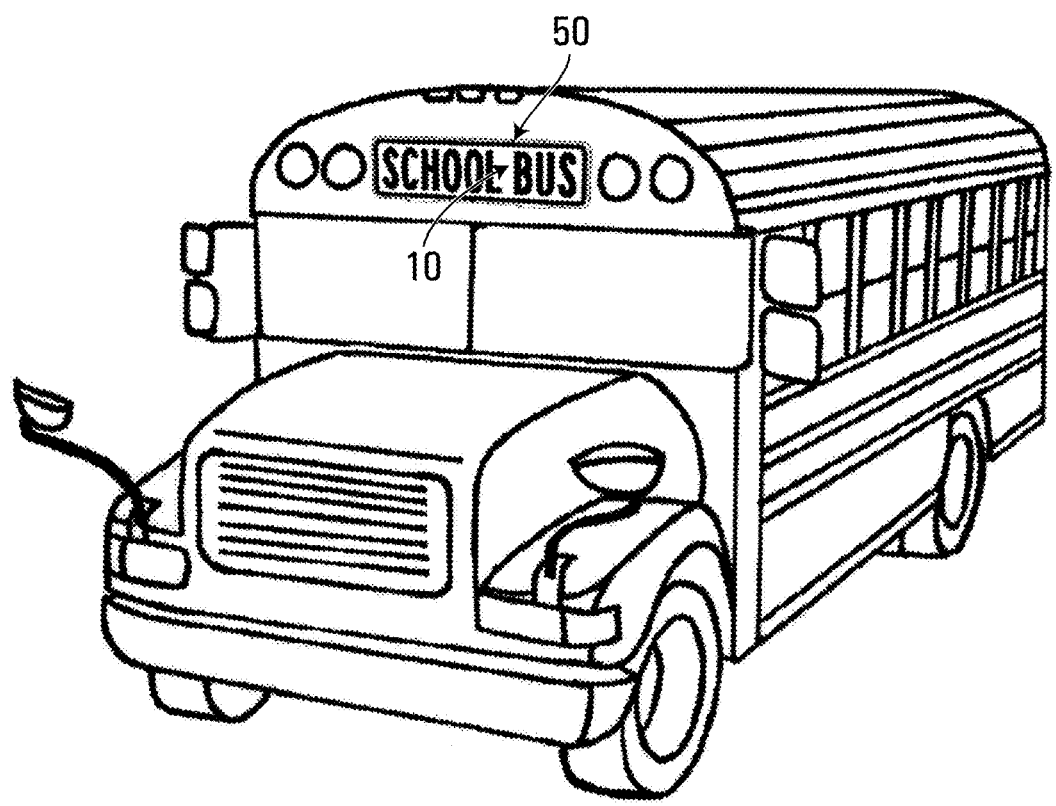
FIG. 8 is a perspective view of a front end of a vehicle on which the assembled sign and mounting frame of FIG. 6 has been installed.
Figure 9:
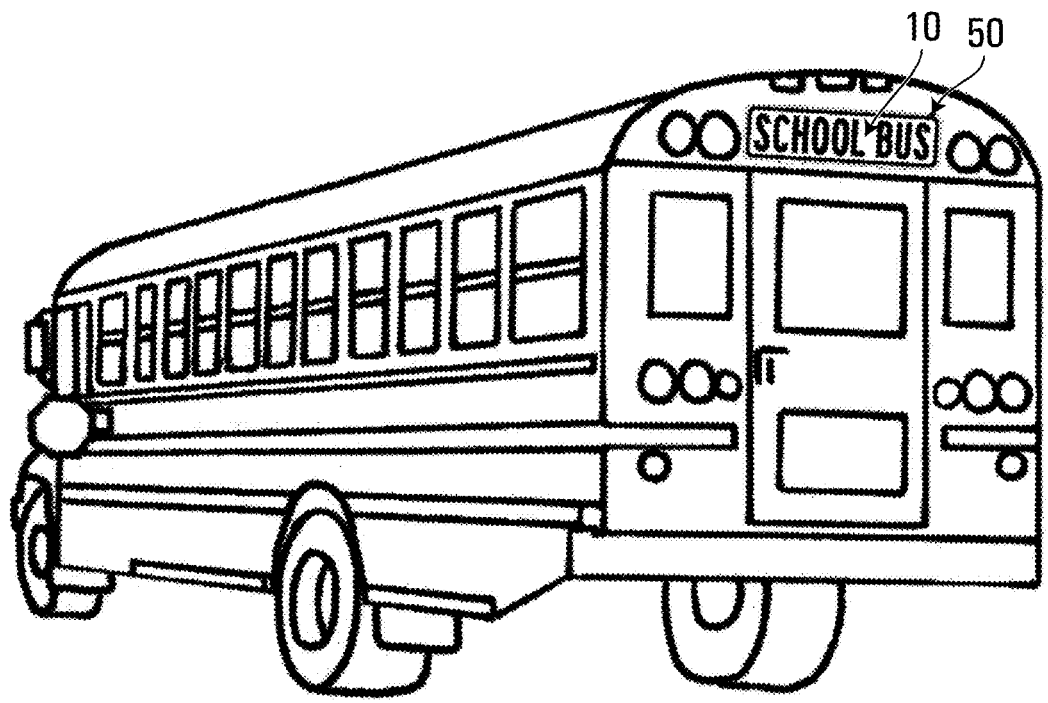
FIG. 9 is a perspective view of a rear end of a vehicle on which the assembled sign and mounting frame of FIG. 6 has been installed.

With the gasketed backside 66b of the backing plate 66 placed against the shell of the bus to insert the mounting studs 82 through the appropriately placed mounting holes in the bus shell, washers and nuts are engaged on the threaded mounting studs 82, and tightened against the inner surface of the bus shell, thereby drawing the gasketed backside of the mounting frame against the outer surface of the bus shell to form a weather tight seal therewith. This securely attaches the mounting frame to the exterior of the bus shell to indirectly support the self-contained illuminated school bus sign 10 thereon. The fastening of the nuts can be performed from the interior space of the bus, or if the warning lights typically mounted beside the designated signage area have been removed or not yet installed, from the outside of the bus via the warning-light mounting holes that are currently open. FIG. 8 illustrates such installation of one sign at the designated front signage area above the front windshield of a school bus, and FIG. 9 illustrates matching installation of another sign at the designated rear signage area above the rear emergency exit door of the school bus.

Since the sign 10 is mounted indirectly to the bus via the mounting frame, service or replacement of the sign can be performed without having to remove the entire installation. With the mounting frame left in place on the bus, service personnel can remove the rivets or other fasteners that hold the mounting frame closed at the fastening flanges (e.g. by drilling out the rivets 80). The service personnel can then open up the two-piece clamshell mounting frame 50 to gain access to the sign 10, disconnect the connector 30 from the power adapter, and then fully remove the disconnected sign 10 from the mounting frame. A new sign 10 can be lifted up into place, coupled to the power adapter via the connector 30, and then placed into the opened mounting frame. Optionally, a fresh application of sealant around the electrical routing hole 32d in the backing plate 66 of the mounting frame 50 may be provided. New rivets or other fasteners are installed at the fastening flanges to lock the mounting frame closed.

Signs may therefore be replaced in the event of failure, or can be swapped out for signs with different school bus indicia in the event of an intended service type change from school bus to activity bus, or vice versa; or in the event that the bus is being transferred to a service area with different language requirements. In the event it is still in usable condition, the removed sign can be re-used either at a later time on the same bus, or on a different bus, without the indirectly-mounted sign having been marred by any drilled holes or other defects that would otherwise be introduced by direct-mounting techniques.

Use of a separating mounting frame may also allow an installation-ready sign product that can be used on an on-demand basis, particularly where the individual signs and mounting frames have been prefabricated to reduce lead time. For example, at the manufacturer or distributer level, a customer-ready product is only assembled once the customer specifies the particular sign type required (School Bus, Activity Bus, Ecoliers, etc.), at which point the manufacturer selects a sign of appropriate wording from among pre-fabricated signs, and combines it with a pre-fabricated mounting frame of compatible shape and size. The selected sign and frame can be pre-assembled by the manufacturer or distributor, by inserting the selected sign into the mounting frame and riveting or otherwise fastening the frame closed, and then shipping the assembled installation-ready sign product to the customer. Alternatively, the selected sign and frame can be shipped to the customer unassembled for on-site customer assembly. In another instance, instead of pre-fabricating significant volumes of identically shaped but differently worded signs together with a significant volume of mounting frames compatible with that size and shape of sign, a supply of mounting frames can be pre-fabricated, while the signs are instead made at reduced volumes or on an as-needed basis in response to customer orders. Once again, lead times may be reduced compared to on-demand manufacture of a framed, customer-specific direct-mount sign.

What has been described is merely illustrative of some embodiments of the present disclosure. Other embodiments are possible and will now be described. It will be understood that features from one or more embodiments may be combinable with features from one or more other embodiments without departing from the scope of the present disclosure.

Figure 10A:
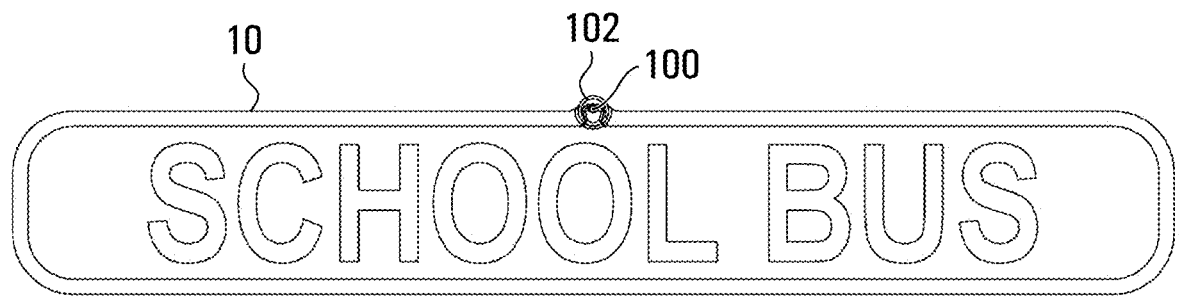
FIG. 10A is a front view of a sign according to one embodiment of the present disclosure.
Figure 10B:
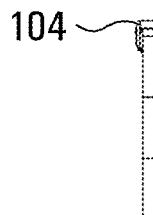
FIG. 10B is a side view of the sign of FIG. 10A.

Referring to FIGS. 10A and 10B, in some embodiments, the sign may include a camera capable of sending a video signal via wired or wireless methods, for example from the rear of the bus, to the driver or an intermediate transmitter for monitoring locally or remotely. In such embodiments, a sign includes a camera 100 positioned approximately halfway across the width of the sign in a camera housing 102. Optionally, enclosed transmitter 104 is included to transmit the video signal.

Figure 11:
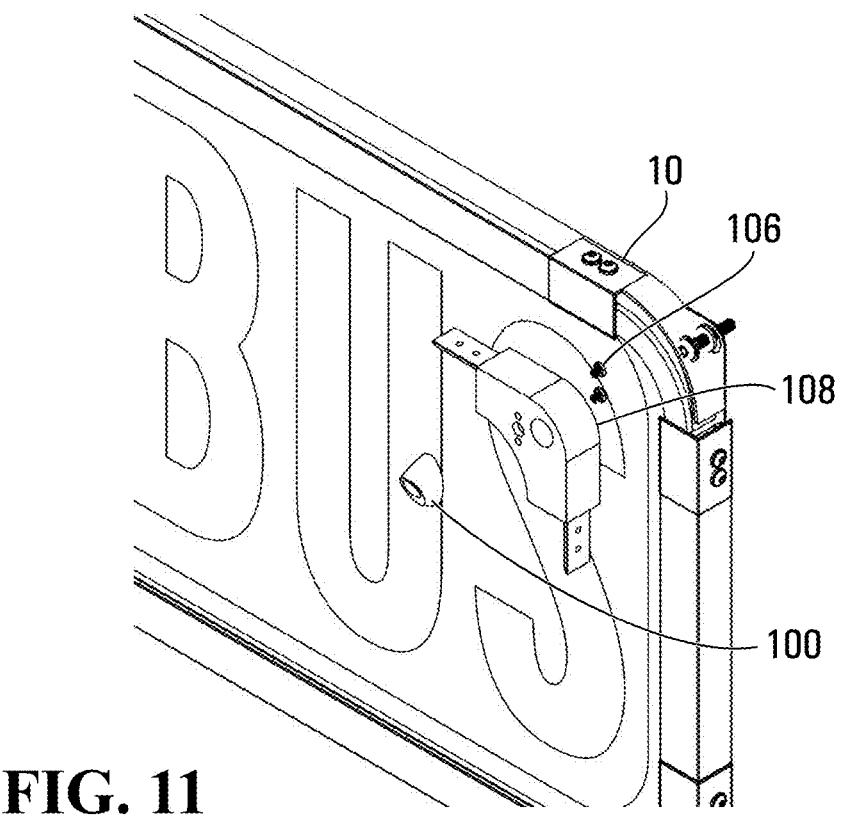
FIG. 11 is a perspective view of a portion of a sign according to one embodiment of the present disclosure.
Figure 12:
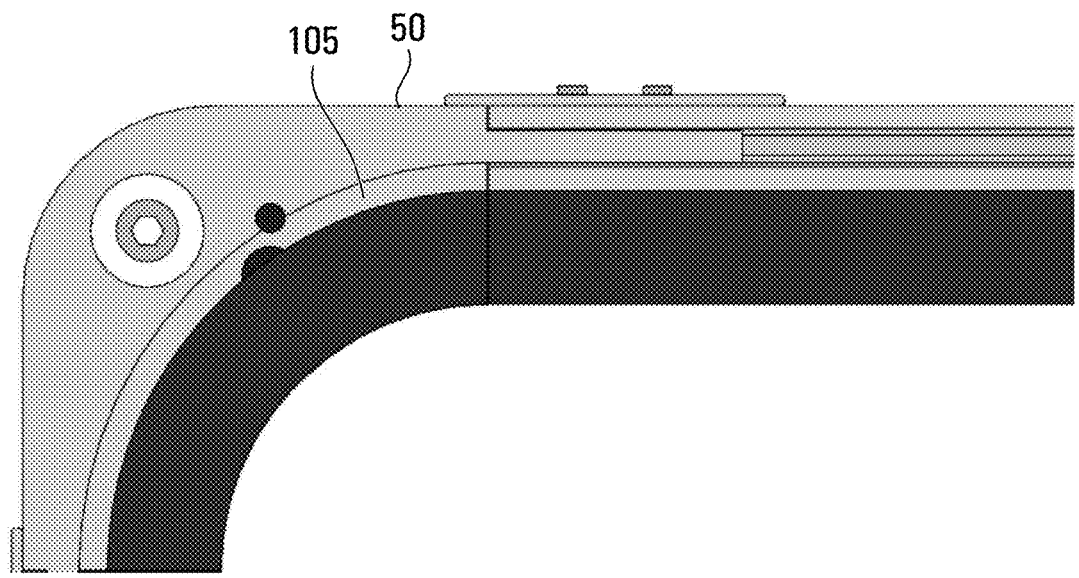
FIG. 12 is a rear view of a portion of the sign of FIG. 11.

Alternatively, referring to FIGS. 11 and 12, the camera 100 may be mounted in the upper corner of the frame of the sign 10. The wiring for the camera 100 may be integrated into the sign assembly 10, described above. The cabling is routed through a space 105, such as a channel or groove, behind the seals from the camera 100 to the vehicle. The cabling or wiring for the camera 100 could then be connected to the electrical system of the bus by being passed through the same apertures used to provide the wiring and power to the LED strips and panel of the sign assembly.

Mounting of the camera 100 to the frame may be accomplished utilizing camera mounting hardware 106, for example the illustrated screws, which run through the sign frame or by using an adhesive to the outside surface of the frame. Alternatively, or in addition, the camera 100 may be held in place in a removable frame corner piece 108 of the frame.

Figure 13A:
FIG. 13A is a top view of a sign according to one embodiment of the present disclosure.
Figure 13B:
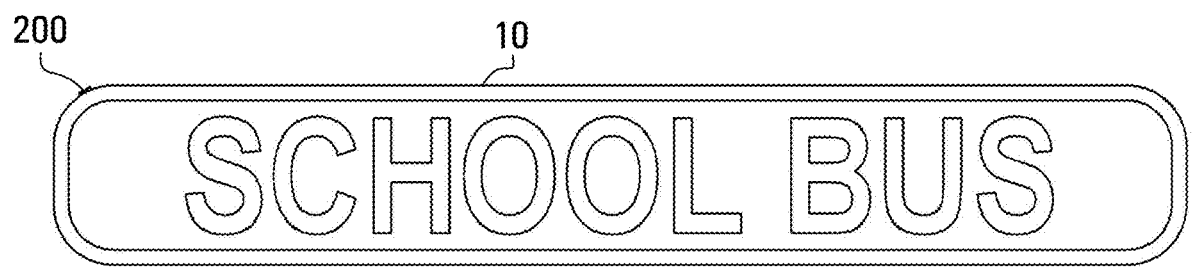
FIG. 13B is a front view of the sign of FIG. 13A.
Figure 14A:
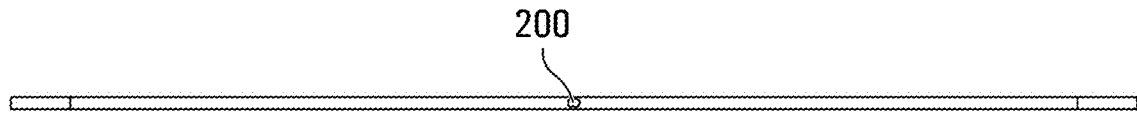
FIG. 14A is a top view of a sign according to one embodiment of the present disclosure.
Figure 14B:
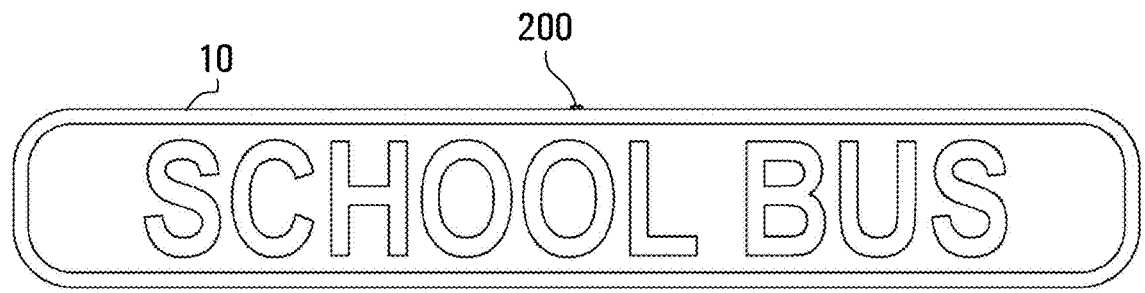
FIG. 14B is a front view of the sign of FIG. 14A.

Referring to FIGS. 13A, 13B, 14A and 14B, in some embodiments, the sign may include a photo sensor 200 which detects light conditions and aids controlling the illumination of the sign such that it is autonomously on/illuminated during low light level conditions. Such a sensor 200 could be located anywhere practical on the outside of the frame 50 or sign assembly 10, for example the upper left corner as shown in FIGS. 13A and 13B and the center top as shown in FIGS. 14A and 14B. The sensor 200 may be installed with appropriate sealing to prevent moisture and other elements from entering the frame and/or sign assembly. If wired, the wiring from the sensor may be routed behind the seal through the same apertures used to electrically connect the sign to the electrical system of the bus.

The sensor could also be used to control brightness of the sign based on the amount of ambient lighting. In this embodiment, the sensor 200 would detect an amount of exterior ambient light and send a signal for controlling a brightness of the sign backlighting relative to the amount of detected light. This may allow for optimal backlighting in all conditions. The backlighting could be varied in several discrete steps or by infinitely small steps relative to the sensor reading. The backlighting would be varied without input from a vehicle operator.

Figure 15:
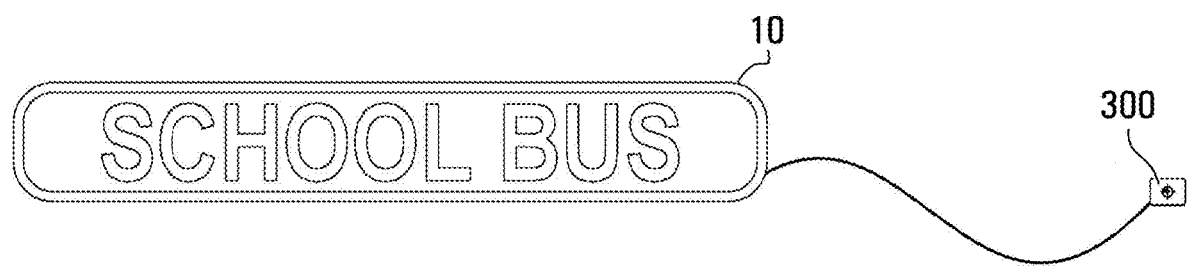
FIG. 15 is a front view of a sign according to one embodiment of the present disclosure.

Referring to FIG. 15, in some embodiments, the brightness of the sign 10 may be controlled by a multi-position or continuously variable switch 300 and internal controls. The switch 300, as shown schematically in FIG. 15, may be integrated into the bus control panel, be original equipment on the bus, or may be integrated into the sign 10 or a separate sign controller.

In some embodiments, the sign may be illuminated in short periods to create a pulsating or strobe effect. The effect occurs for a set amount of time. It may be periodic or non-periodic. It may alternate between on and off states or on states with different brightness levels. It may be triggered by other devices on the bus, such as the depression of the brake pedal.

Figure 16:
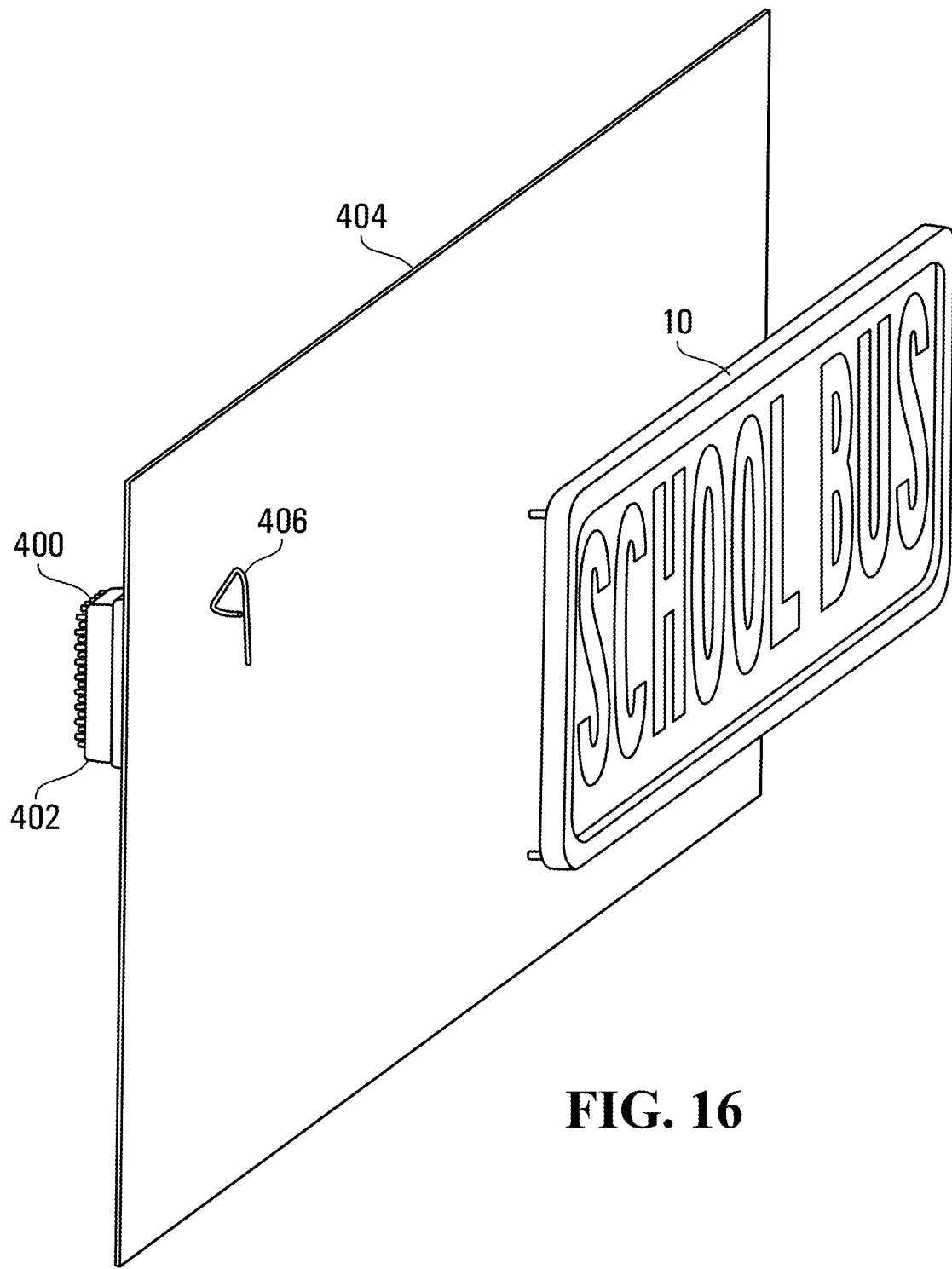
FIG. 16 is an exploded perspective view of a sign assembly according to one embodiment of the present disclosure.

Referring to FIG. 16, in some embodiments, the illuminated sign may use electrical power and a separate module 400 located external to the sign assembly that controls illumination. In some embodiments, this module includes a printed circuit board that is attached to an enclosure 402 that can be mounted internal to the vehicle on an interior of the vehicle shell 404. The enclosure may include a heat sink to dissipate heat generated by the electronics. In some embodiments, a cable 406 is used to connect the electronic module to the sign unit. By having the electronic board internal to the vehicle, the risk of damage may be lessened. Additionally, this may allow for the sign unit to be thinner. In some embodiments, the cabling is routed through a grommeted hole of the vehicle shell to aid in preventing any moisture or debris from entering the vehicle. The electronic module 400 may be mounted using adhesives or mechanical fasteners or other suitable methods depending on the installation requirements of the vehicle to which the sign is being mounted.

Figure 17:
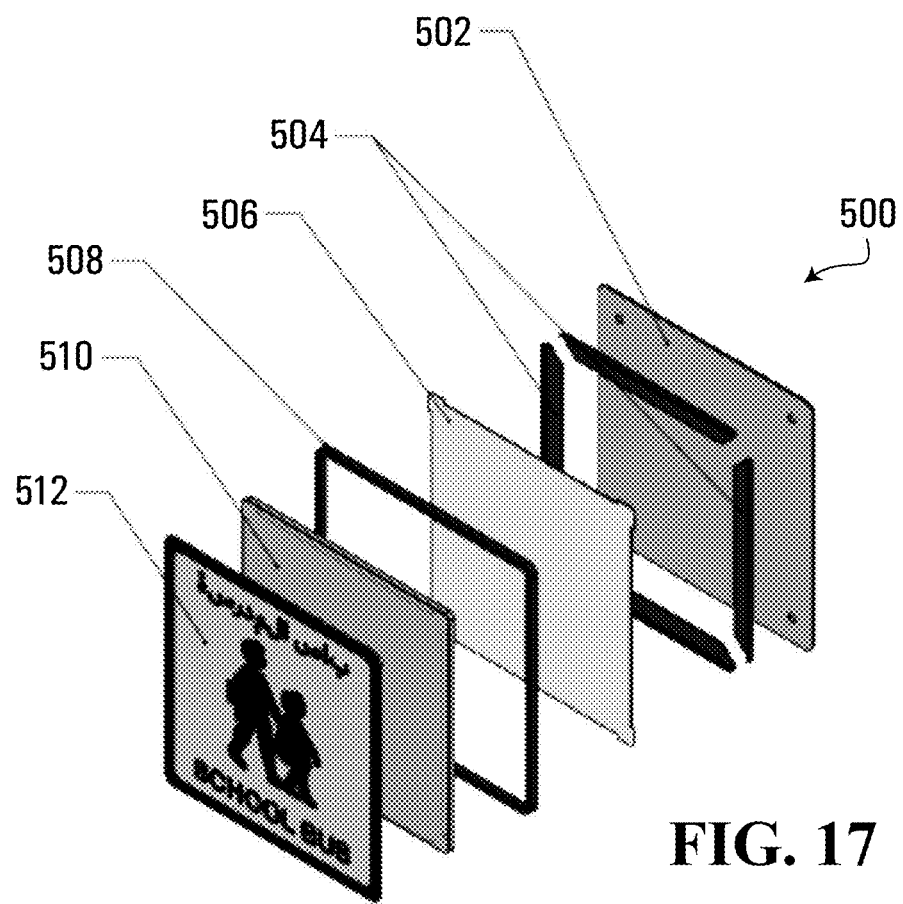
FIG. 17 is an exploded perspective view of a sign assembly according to one embodiment of the present disclosure.

As discussed above, the illuminated sign 10 may have different geometries and indicia 20, translucent areas 22 and opaquely masked areas 24, depending on the requirements and applications of the sign. One such additional embodiment of a sign 500 is shown in FIG. 17, with a back plate 502, LED strips 504, reflector 506, seal 508, acrylic backing plate 510 and front lens 512.

Other embodiments for mounting the combined sign and frame to vehicles are also included in the present disclosure. Different embodiments may be required depending on the configuration of the vehicle to which the frame is mounted. For example, some buses currently available may include a chamber in the overhead section of the bus at the front and rear, with an interior planar surface which faces forward in the front and backward in the rear of the bus. The chamber may have a sealed transparent cover aligned with the outside surface of the bus which allows the interior indicia to be visible to other vehicles approaching the bus from either direction. This cover may be referred to as the front surface regardless of whether it is on the forward or rear facing chamber of the bus. Embodiments of the self-contained illuminated sign according to the present disclosure may be mounted in such a chamber according to one or more of the following methods.

Figure 18:
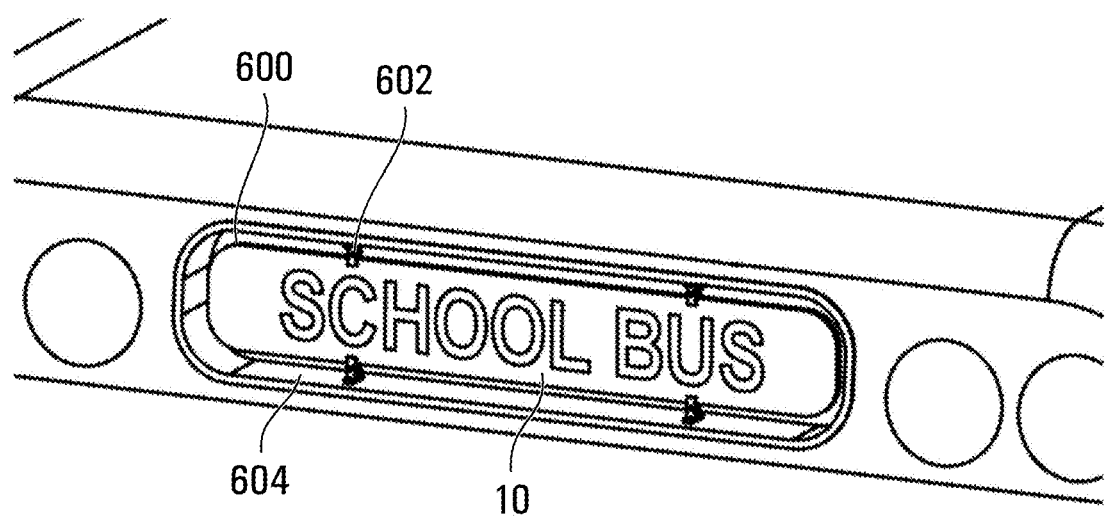
FIG. 18 is a perspective view of a sign assembly according to one embodiment of the present disclosure.

Referring to FIGS. 18 and 19, the sign 10 may be mounted in the chamber 600 using one or more brackets 602, which are attached to the sign 10 and to the surrounding surface 604 parallel to the perimeter of the sign 10 by means of threaded fasteners, adhesives, rivets, magnets, vacuum cups, or other known fastening methods.

Referring to FIGS. 20 and 21, in some embodiments, the sign 10 may be attached, utilizing any of the previously mentioned fasteners, to the interior rear planar surface of the chamber 600 by means of an intermediate bracket 606 which provides both mounting and spacing of the sign from the surface to improve visibility. The intermediate bracket 606 may be comprised of one or more pieces, which have sizes smaller or larger than the sign itself. The pieces may be tubular, rectangular, or any other useful shape.

Figure 22:
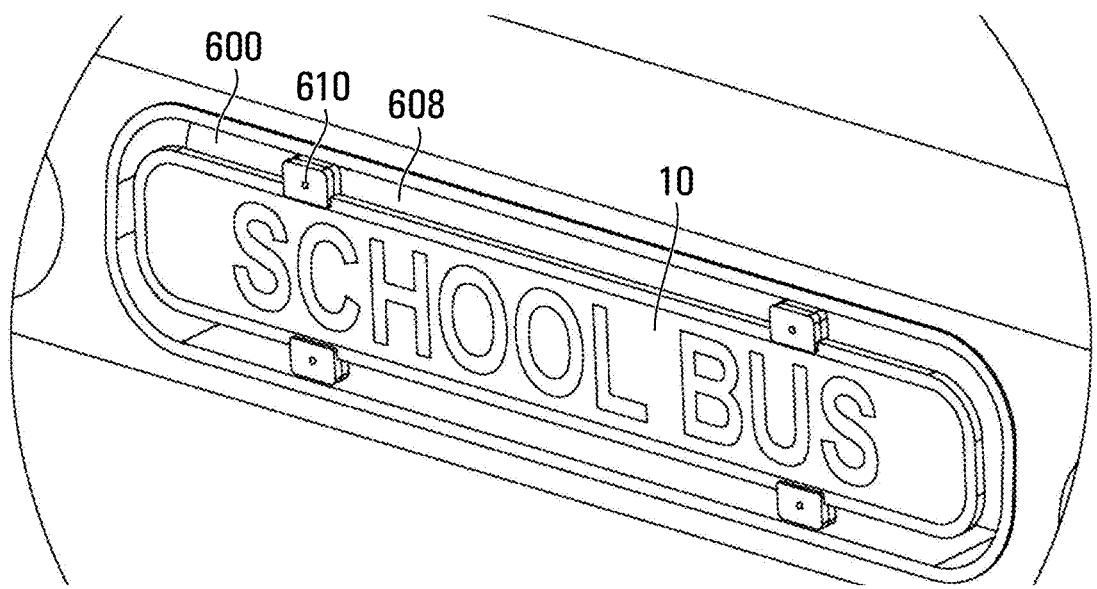
FIG. 22 is a perspective view of a sign assembly according to one embodiment of the present disclosure installed in a vehicle.

Referring to FIG. 22, in some embodiments, the sign may be attached, utilizing any of the previously mentioned fasteners, to the interior front transparent surface 608 of the chamber 600 by means of one or more intermediate brackets 610. The intermediate bracket 610 may be comprised of one or more pieces which are tubular, rectangular, or any other useful shape. In some embodiments, the bracket 610 attaches to the outer rim of the sign 10 in such a way that it does not interfere with the visibility of the indicia 20. The pieces of bracket 610 may be of different lengths and profiles according to the shape of the transparent surface 608 to facilitate vertical mounting of the sign.

Figure 23:
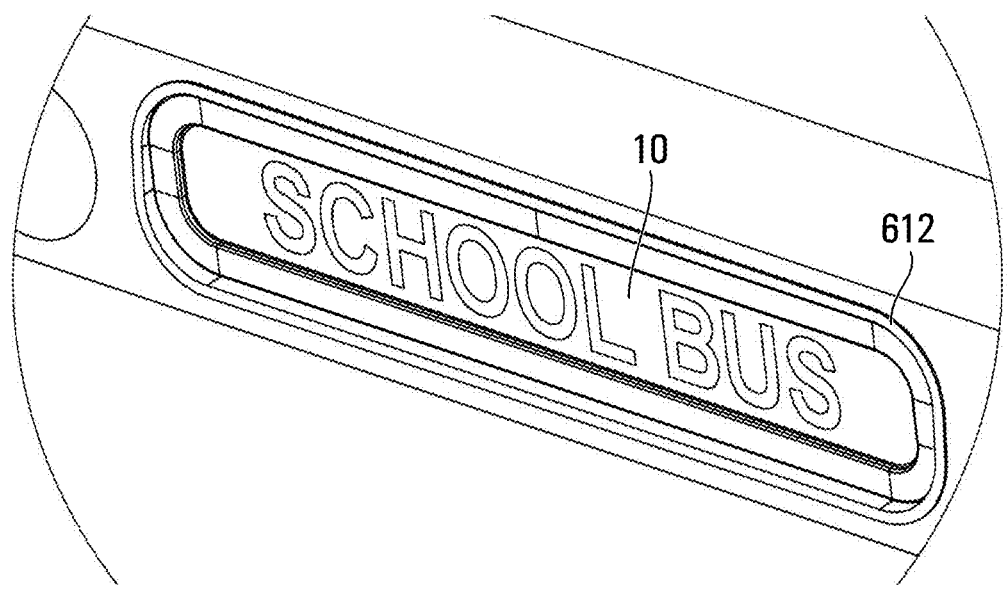
FIG. 23 is a perspective view of a sign assembly according to one embodiment of the present disclosure installed in a vehicle.

Referring to FIG. 23, in some embodiments, the sign 10 may be surrounded at its perimeter with a frame material 612 of outer perimeter equal to or larger than the interior perimeter of the bus chamber 600. In some embodiments, the sign and the surrounding material 612 is installed into the chamber 600. In some embodiments, the material 612 is flexible enough that the installation can be completed without damaging the sign and rigid enough that the sign is held properly in place during operation. The material 612 may be a foam, elastomer, or other suitable material. The material 612 may be fastened to the bus using any of the previously mentioned methods. The material 612 may be of various shapes including the shape of the chamber 600. The material may be non-homogenous or filled with a fluid.

Figure 24:
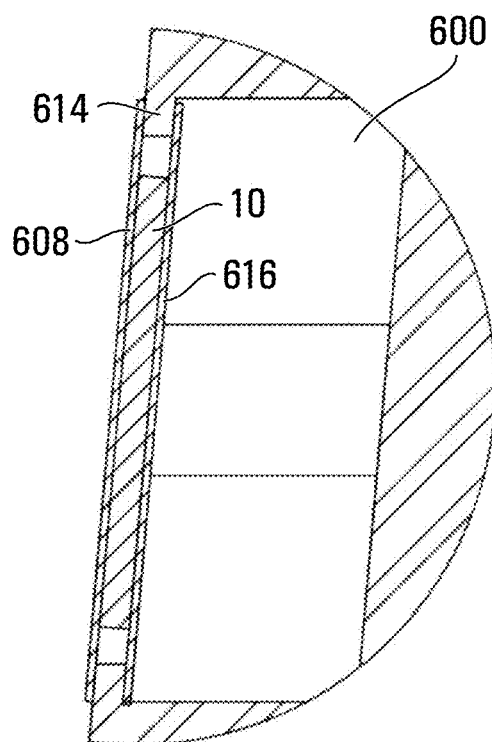
FIG. 24 is a cross-sectional view of a sign assembly according to one embodiment of the present disclosure installed in a vehicle.

Referring to FIG. 24, in some embodiments, the surface of the sign 10 is mounted flush to the bus shell 614 and held in place between a transparent material 608 on the outside surface of the bus and a back plate 616. In some embodiments, sealing occurs between the border of the transparent material 608 and bus shell 614 by means of a gasket or o-ring.

Figure 25:
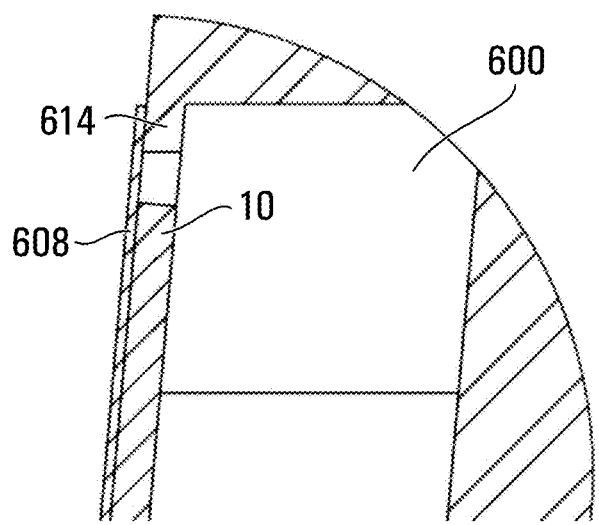
FIG. 25 is a cross-sectional view of a sign assembly according to one embodiment of the present disclosure installed in a vehicle.

Referring to FIG. 25, in some embodiments, the surface of the sign 10 is mounted flush to the bus shell 614. In some embodiments, the sign 10 is connected to the transparent material 608 which is larger than the opening in the bus shell. In some embodiments, the transparent material 608 is fastened to the bus shell. In some embodiments, sealing occurs between the border of the transparent material 608 and bus shell by means of a gasket or o-ring.

Figure 26:
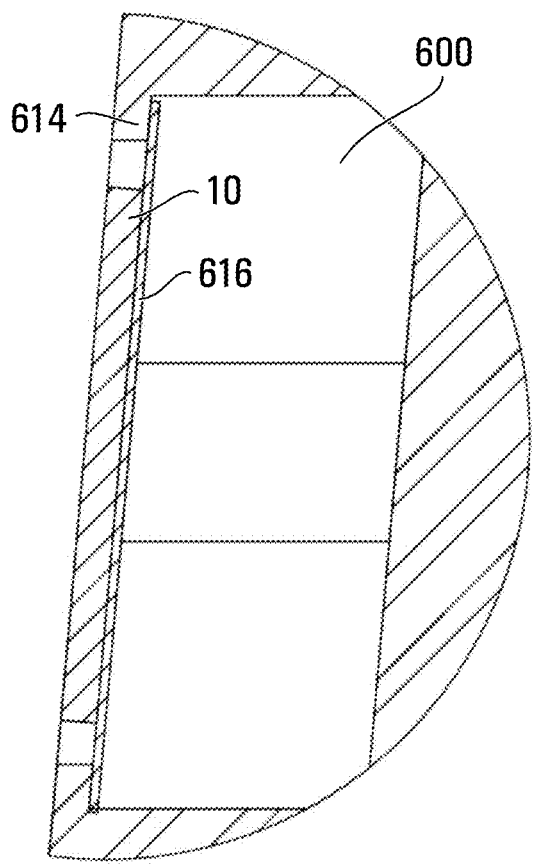
FIG. 26 is a cross-sectional view of a sign assembly according to one embodiment of the present disclosure installed in a vehicle.

Referring to FIG. 26, in some embodiments, the surface of the sign 10 is mounted flush to the bus shell 614. In some embodiments, the sign 10 is connected to the back plate 616 which is larger than the opening in the bus shell 614. In some embodiments, the back plate 616 is fastened to the bus shell 614. In some embodiments, sealing occurs between the back plate 616 and the bus shell 614 by means of a gasket or o-ring.

Other embodiments of mounting methods may be used to mount the sign 10 directly on an exterior surface of a vehicle such as a bus. Attachment between the sign or an intermediate frame, enclosure, or mounting bracket may be accomplished according to the following embodiments.

Figure 27:
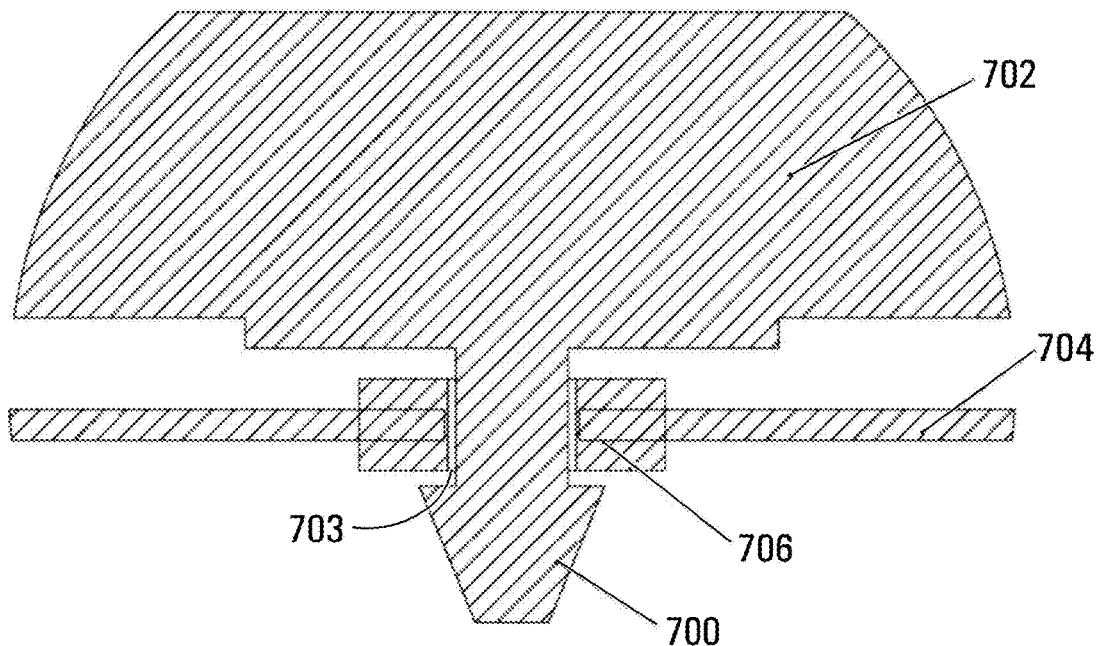
FIG. 27 is a cross-sectional view of a mounting option for a sign assembly according to one embodiment of the present disclosure.
Figure 28A:
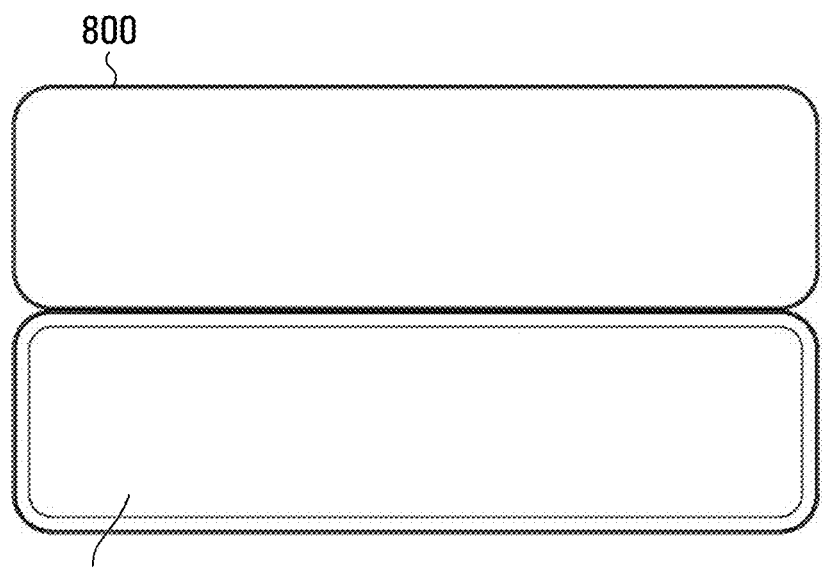
FIG. 28A is a front view of a sign assembly according to one embodiment of the present disclosure.
Figure 28B:
FIG. 28B is a side view of the sign assembly of FIG. 28A.
Figure 28C:
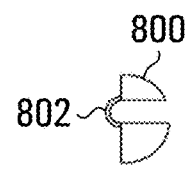
FIG. 28C is a close up of a hinge portion of the sign assembly of FIG. 28A.
Figure 29A:
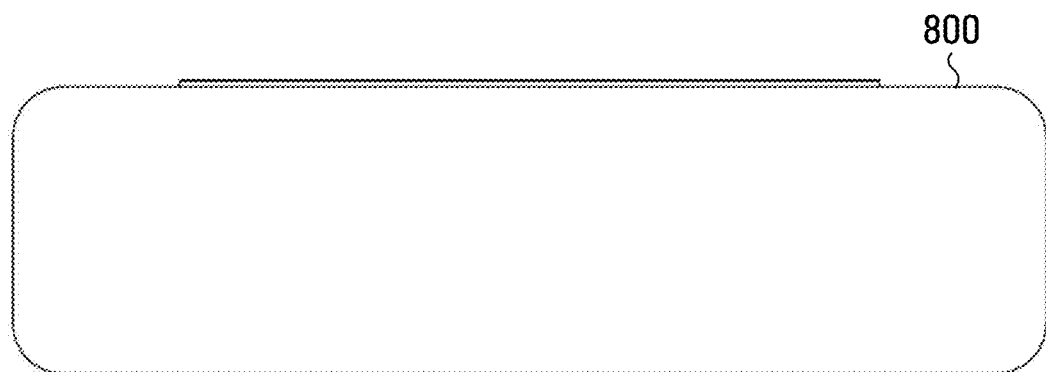
FIG. 29A is a front view of the sign assembly of FIG. 28A in a closed position.
Figure 29B:
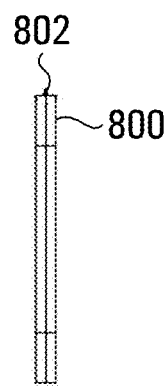
FIG. 29B is a side view of the sign assembly of FIG. 28A in a closed position.
Figure 29C:
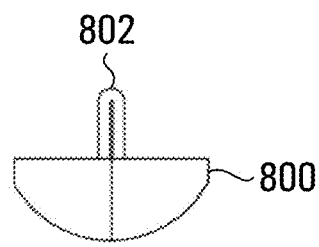
FIG. 29C is a close up of the hinge portion of the sign assembly of FIG. 28A in a closed position.

Referring to FIG. 27, in some embodiments, mounting of the sign may be accomplished using a conical, spherical, or otherwise purposeful shaped object 700 which extends from the sign, intermediate frame, sign enclosure or mounting bracket, generally referred to as 702, through an aperture 703 in the vehicle shell or other surface 704 and expands an opposing flexible grommet 706, resisting removal once installed.

In some embodiments, attachment between the sign or an intermediate frame, enclosure, or mounting bracket with the bus shell may be accomplished with the use of a magnet, adhesive, bonding or solidifying material.

Embodiments of framing or providing an intermediate bracket for the sign may also include enclosing or affixing the sign by means of encapsulating with a transparent material (epoxy, overmolded, etc.) or enclosing or affixing the sign 10 with a single piece frame 800 which pivots by means of a hinge 802, as shown in FIGS. 28A, 28B, 28C, 29A, 29B, and 29C.

Figure 30A:
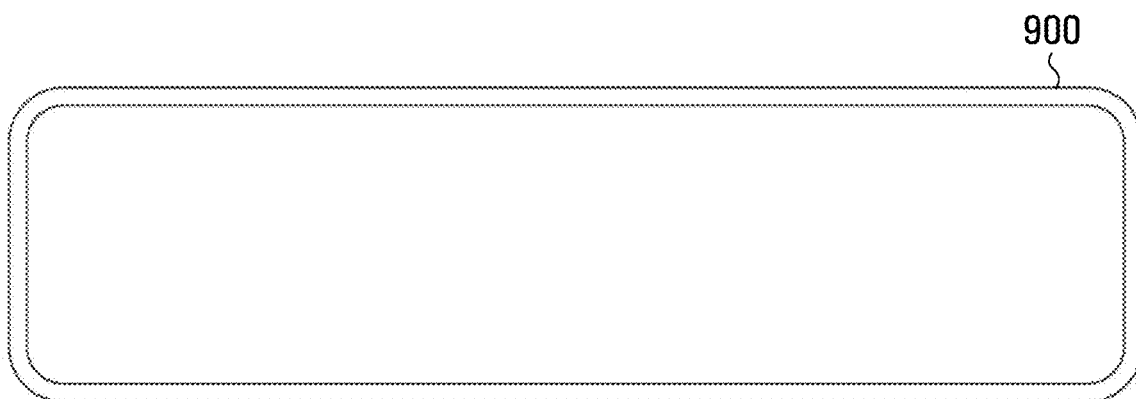
FIG. 30A is a front view of a sign assembly according to one embodiment of the present disclosure.
Figure 30B:
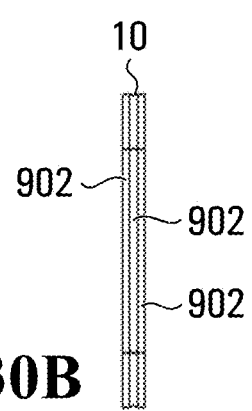
FIG. 30B is a side view of the sign assembly of FIG. 30A.
Figure 31A:
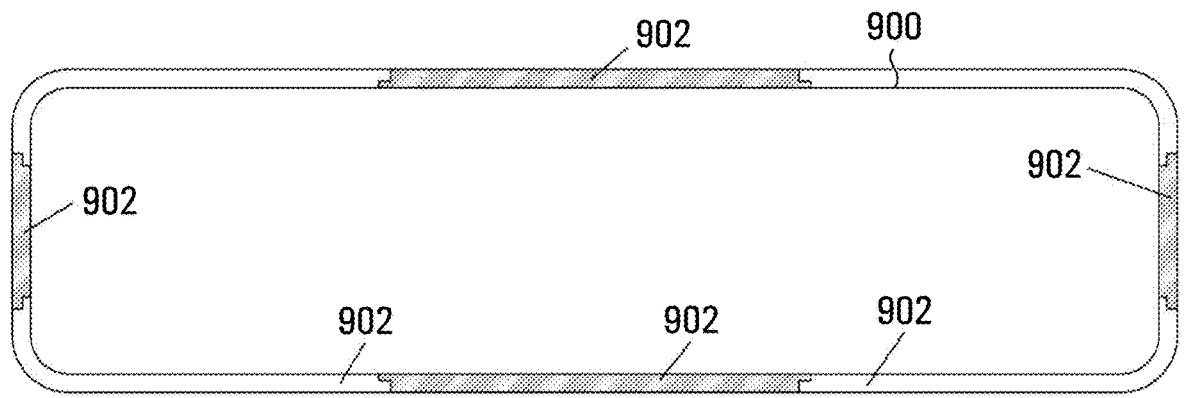
FIG. 31A is a rear view of a sign assembly according to one embodiment of the present disclosure.
Figure 31B:
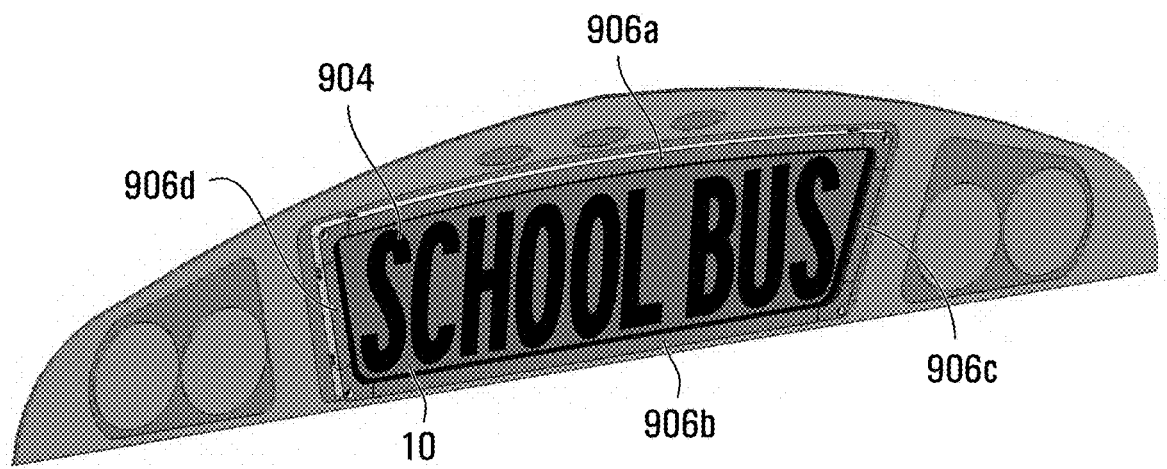
FIG. 31B is a perspective view of a frame and sign mounted to a vehicle according to one embodiment of the present disclosure.

Referring to FIGS. 30A, 30B, and 31A, in some embodiments, a frame 900 for the sign 10 may be comprised of three or more layered sub frames 902, closed by means of bolts, rivets, adhesives, external clamping, magnets, or any other suitable fastening technique.

In some embodiments, the frame may be a single piece frame whereby the sign is enclosed by means of intentional deformation of the frame (crimping, stamping, pressing, etc.). In some embodiments, the single piece frame may be comprised of a malleable material which is routed around the perimeter of the sign and is joined thereafter.

Referring to FIGS. 31B through 31E, in some embodiments a frame 904 according to the present disclosure may be comprised of multiple frame sections 906 that are connected together. As shown in the illustrative embodiment, the sections 906 may be assembled to produce the frame 904 having a shape that matches an outline of the sign. When assembled, the frame 904 has a front window that matches or corresponds to the shape of the front display area of the sign 10.

Figure 31C:
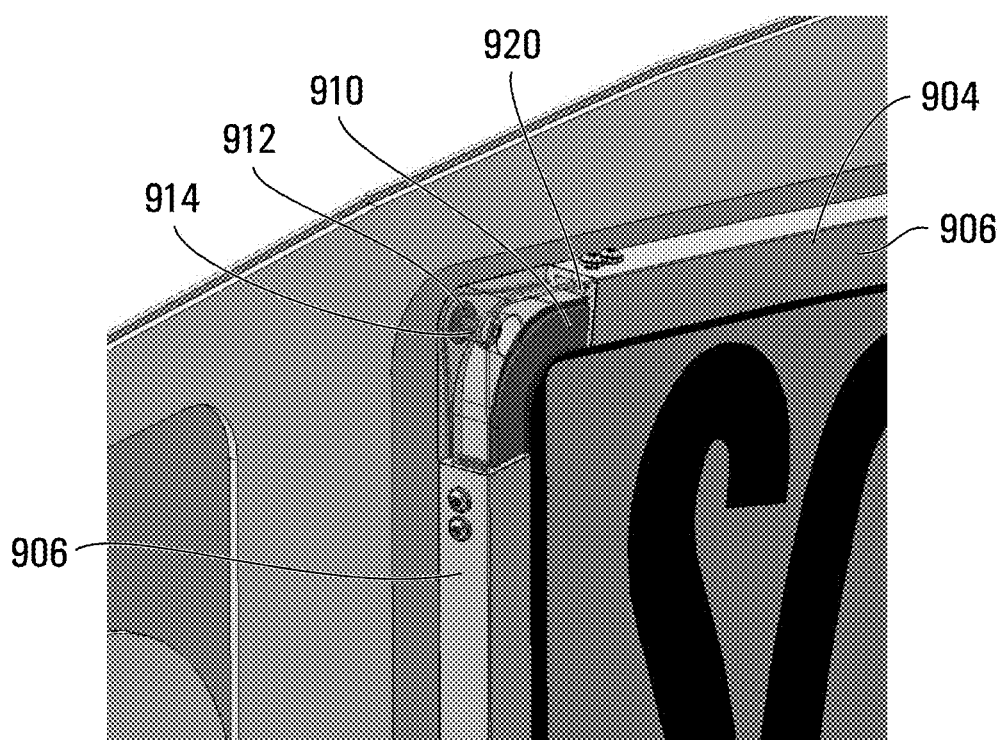
FIG. 31C is a close up of a portion of FIG. 31B.
Figure 31D:
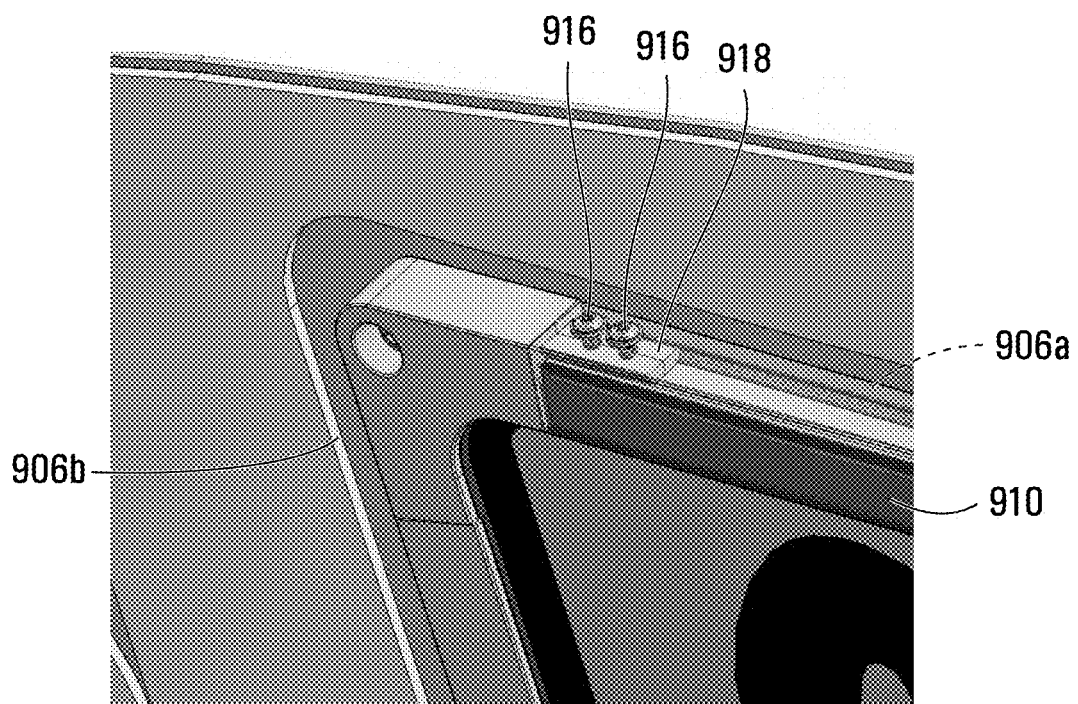
FIG. 31D is a further close up of a portion of FIG. 31B.
Figure 31E:
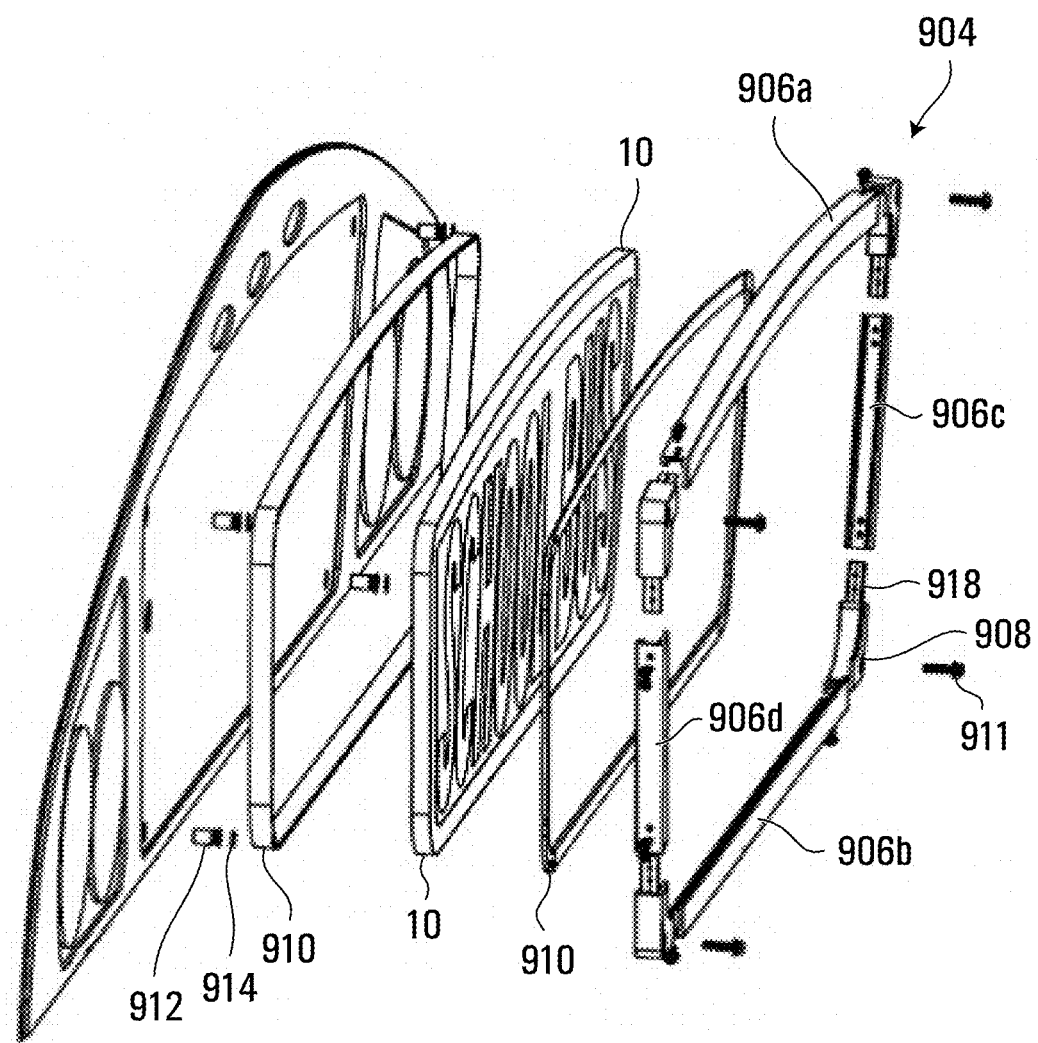
FIG. 31E is an exploded view of the embodiment shown in FIG. 31B.

The frame 904 may be composed of horizontal sections 906a and 906b that span lengths of a sign (e.g. sign 10) and vertical sections 906c and 906d that span the height of the sign on either side thereof. Corner sections 908 comply with the shape of the sign and connect together the horizontal sections 906a and 906b with the vertical sections 906c and 906d. In FIG. 31C, the corner section 908 is shown transparent. In FIG. 31D, the horizontal section 906a is shown transparent.

Sections of the frame other than corner sections 908 may be termed elongated sections. The term elongated does not necessarily require that the section be straight. A curved elongated section, such as horizontal section 906a, would be considered elongated within the meaning of the present disclosure. In general, any sections other than corner sections, which are defined as sections that span a corner of 90 degrees or more, are considered to be elongated sections for the purposes of the present disclosure. Internal corner sections, such as the internal corner sections at the top of the sign in FIG. 31G are also included in the definition of corner sections.

In the illustrated embodiment, at least each elongated section comprises an approximately L-shaped cross-section. When the sign is received in the mounting frame, one arm of the L-shaped cross section is generally parallel to an outer edge surface of the sign and the other arm of the L-shaped cross-section is generally parallel with a front surface of the sign, such as a front surface of the front display.

The frame 904 frame retains the sign 10 on the sign's front and outside edges while constraining against either a back panel (not shown) or the vehicle itself depending on desired configuration. In the illustrated embodiment, the frame 904 has foam tape 910 between all contact points with the sign 10 to aid in dampening vibration and allowing for relative expansion of the sign 10. The frame 90 may be mounted via the corner pieces 908 which are screwed into riv-nuts 912 that are mounted into the vehicle using bolts 911. There are sealing washers 914 that aid in preventing leaks at these connection points. Other suitable means for connecting corner sections 908 to the vehicle may also be used.

In the illustrated embodiment, the frame sections 906 are joined to the corner sections 908 with screws 916 that pass through the respective frame section 906 and a jutting portion 918 that juts out from the corner section and into the respective frame section 906 to which the corner section is being connected. The frame sections 906 have a corresponding aperture 920 to receiving the jutting portion 918.

Figure 31F:
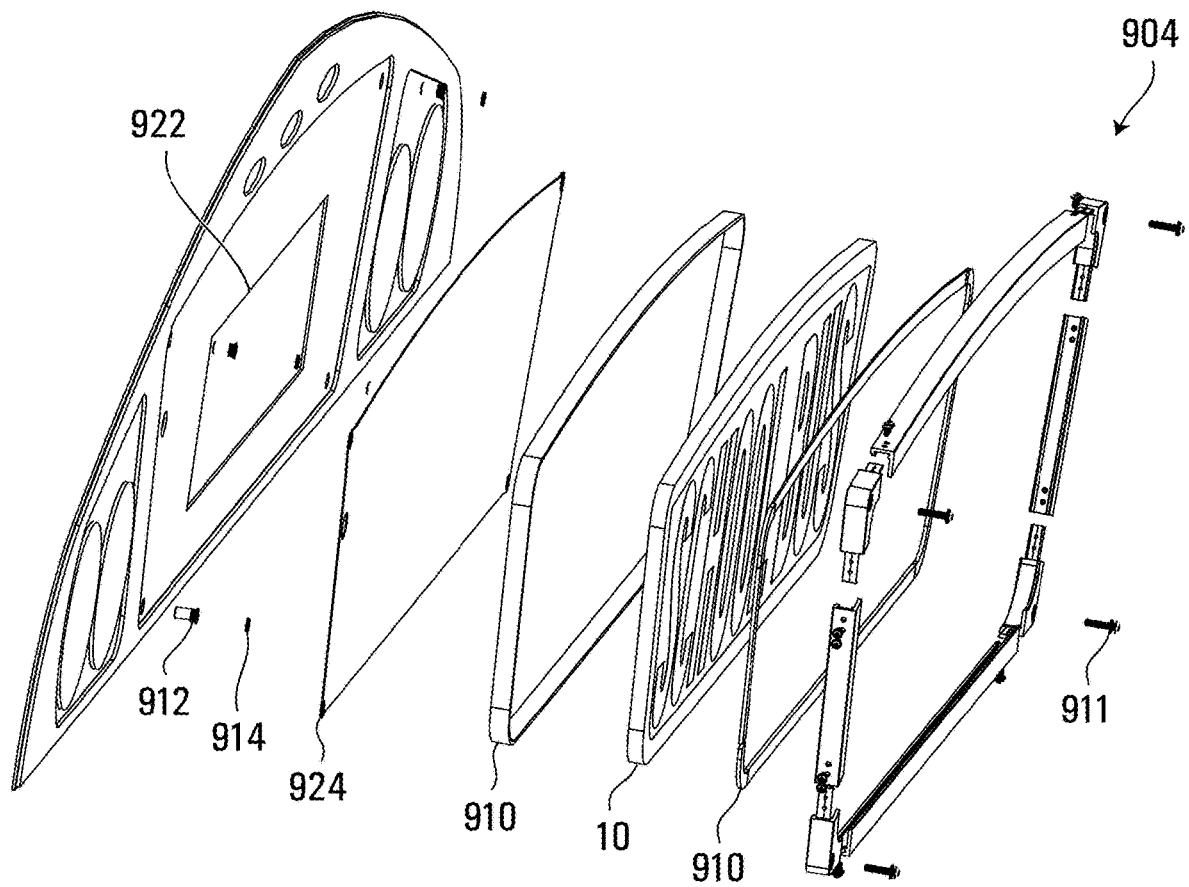
FIG. 31F is an exploded view of a frame and sign mounted to a vehicle according to one embodiment of the present disclosure.
Figure 31G:
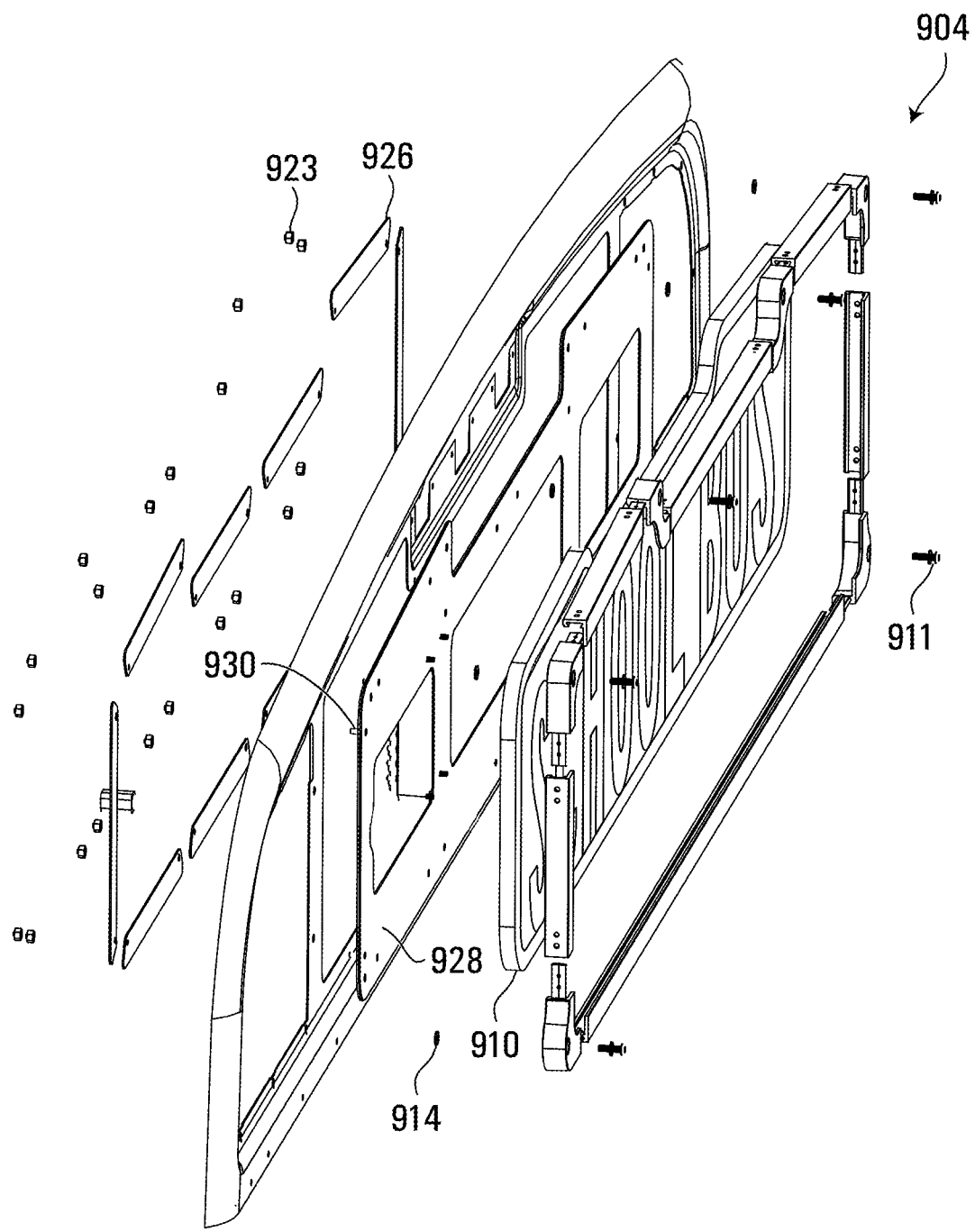
FIG. 31G is an exploded view of a frame and sign mounted to a vehicle according to one embodiment of the present disclosure.

Referring to FIG. 31F, in some embodiments, an opening 922 in the vehicle shell is already present before installation of the frame 904. To accommodate, an additional intermediate plate 924 is included in the assembly to cover the opening 922 and provide an appropriate mounting surface for the sign 10.

Referring to FIG. 31G, in some embodiments, one or more retention plates 926 are included behind the vehicle shell in order to attach the sign 10 without drilling any holes in the shell. To this end, the shell has a pre-existing opening 922. Nuts 923 behind the retention plates 926 may be used to connect the sign 10. A mounting plate 928 with studs 930 is also included, studs 930 entering corresponding apertures in the vehicle shell. It will be noted that the configuration of frame 904 in FIG. 31G includes additional frame sections 906 and corner sections 908 in order to create a frame 904 that corresponds to the desired shape of the sign 10.

Yet further embodiments of an illuminated sign according to the present disclosure will now be described.

Figure 32:
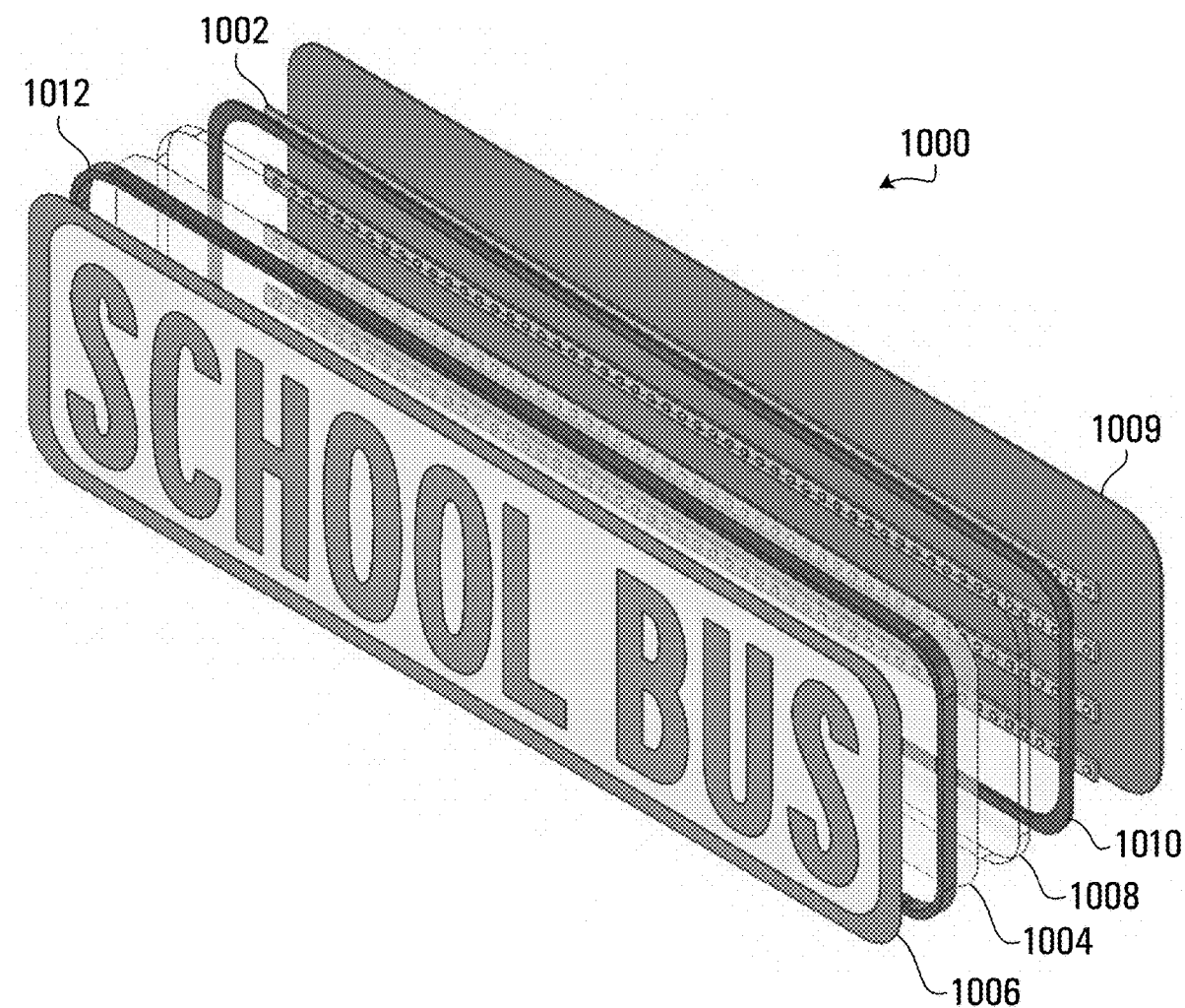
FIG. 32 is an exploded perspective view of a sign according to one embodiment of the present disclosure.

Referring to FIG. 32, in some embodiments, a sign 1000 utilizes several strips of LEDs 1002 combined with an optical diffusion sheet 1004 to provide approximately uniform illumination for the entirety of the sign front lens 1006. In some embodiments, there is a clear plastic spacer 1008 in front of the LEDs 1002 that provide a gap between the diffusion sheet 1004 and the LEDs 1002. In some embodiments, the LED strips 1002 are adhered directly to the back plastic panel 1009. In some embodiments, there is an additional spacer 1010 which permits the clear spacer 1008 to not directly contact the LED strips 1002. In some embodiments, the diffusion sheet 1004 is a film which is applied to the front side of the clear plastic spacer 1008. In some embodiments, the front lens 1006 with the inscribed indicia is the final component of the sign 1000. In some embodiments, a silicone seal 1012 encloses the edge of the sign unit between the layers and prevents dust and moisture from penetrating the unit. In some embodiments, the LEDs 1002 are powered by an electronic source located externally to the sign and inside the vehicle the sign will be mounted to. In some embodiments, the diffusion film 1004 acts to moderate the bright and dark spots provided by the individual LEDs on the rear mounted strips.

Figure 33:
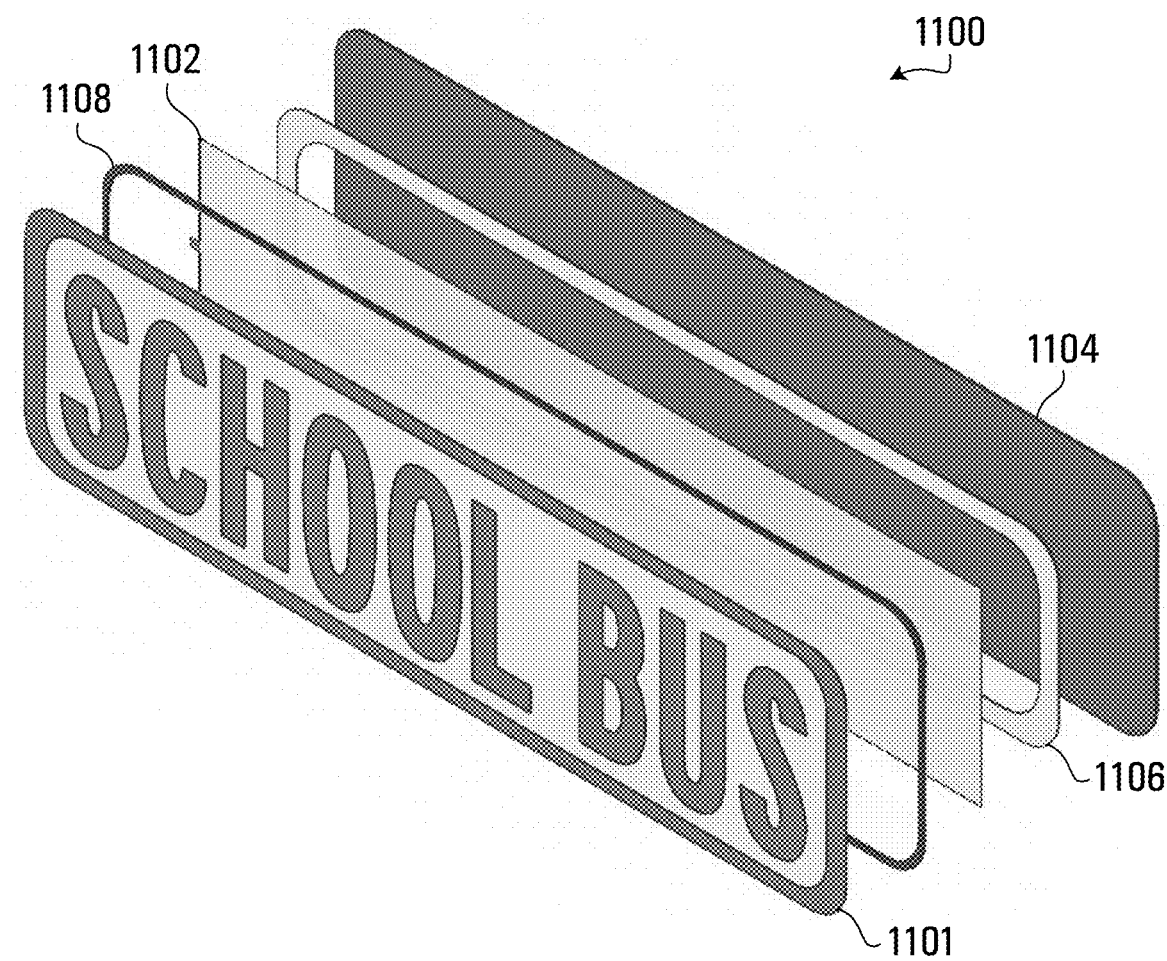
FIG. 33 is an exploded perspective view of a sign according to one embodiment of the present disclosure.

Referring to FIG. 33, in some embodiments, a sign 1100 is fully illuminated by means of an embedded electroluminescent panel 1102 which provides illumination across the entire profile of the sign unit 1100 and for the front lens 1101. In some embodiments, the electroluminescent panel 1102 is connected to a controller inside the vehicle which provides the correct electrical power. In some embodiments, the electroluminescent panel 1102 is adhered to the back plastic panel 1104 via an adhesive sheet 1106 and the sign unit is sealed together via a perimeter silicone seal 1108. In some embodiments, due to the flexibility of the materials utilized, the sign 1100 could be used in applications that are not flat.

In some embodiments, the sign may be capable of being blacked out to produce a blacked-out sign (BOS) where the indicia are temporarily no longer visible. BOS is used here synonymously with a sign which is not legible. In such embodiments, illuminated signs according to the present disclosure may be able to be switched from legible to BOS when desired, such as when the sign is powered off.

In some embodiments, the BOS uses edge lighting technology, for example when the light is directed into the plane of a light diffusive plate, such as an etched acrylic plate, from the edges towards the center of the sign unit. The light reflects from the etched areas on the diffusive plate and the areas that are not etched reflect significantly lower amount of light. This principle may be used in the BOS.

Figure 34:
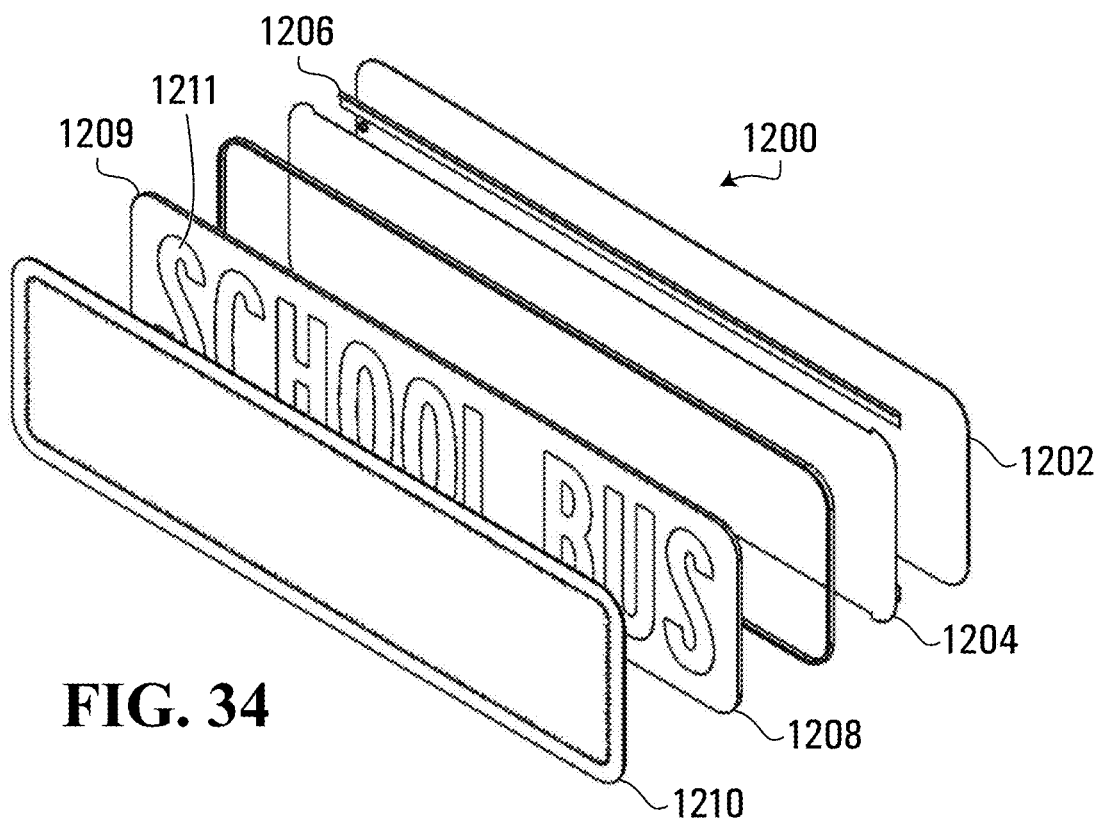
FIG. 34 is an exploded perspective view of a sign according to one embodiment of the present disclosure.

Thus, referring to FIG. 34, in some embodiments, a sign 1200 may be comprised of a back panel 1202, which acts as protective cover on the back of the sign unit; a reflective layer 1204, which reflects the light from the back of the diffusive plate; LED Strips 1206 (light source, LED strips usually attached to aluminum substrate for better heat dissipation); a diffusive plate 1208, which diffuses the light uniformly by reflecting the light from the etched areas 1209 on the back of the diffusive plate 1208, a colored lens 1210 (tinted or painted lens that defines the color of emitted light and/or legend/indicia that appears on the sign); and front cover lens (not shown), which protects the internal components of the BOS. Non-etched areas 1211, such as the letters that spell out SCHOOL BUS, on the diffusive plate 1208 do not reflect the light or reflect less light than the etched areas 1209. Some edging may be printed on the front cover lens to hide internal components/transition lines.

When the BOS is not lit, the legend that is not etched on the acrylic diffusive plate (in the illustrated embodiment "SCHOOL BUS") can be barely visible through the front lens. When the BOS is lit up, the legend that is not etched on the acrylic diffusive plate remains dark, but the etched area reflects light.

Other embodiments of an illuminated sign are also within the present disclosure. For example, when vehicles, such as school buses, stop and allow passengers to exit the vehicle, a stop arm is displayed to warn other drivers on the road to stop and allow the passenger to cross the road. The drivers on the road which are following the bus must look around the left side of the bus to see the stop arm. It is possible that the driver will either drive to the left in his existing lane or commit to passing the bus prior to seeing the stop arm. Thus, in some embodiments, the present disclosure provides a sign at the back of the bus that indicates the actions of the bus in a multiple message sign, such as, for example, "Caution", "Stopping", and "Do Not Pass".

In some embodiments, this sign combines two units that light up independently and show different legends with different background colors depending on the circumstances. In some embodiments, this sign may utilize a configuration and components similar to the BOS sign described above.

Figure 35:
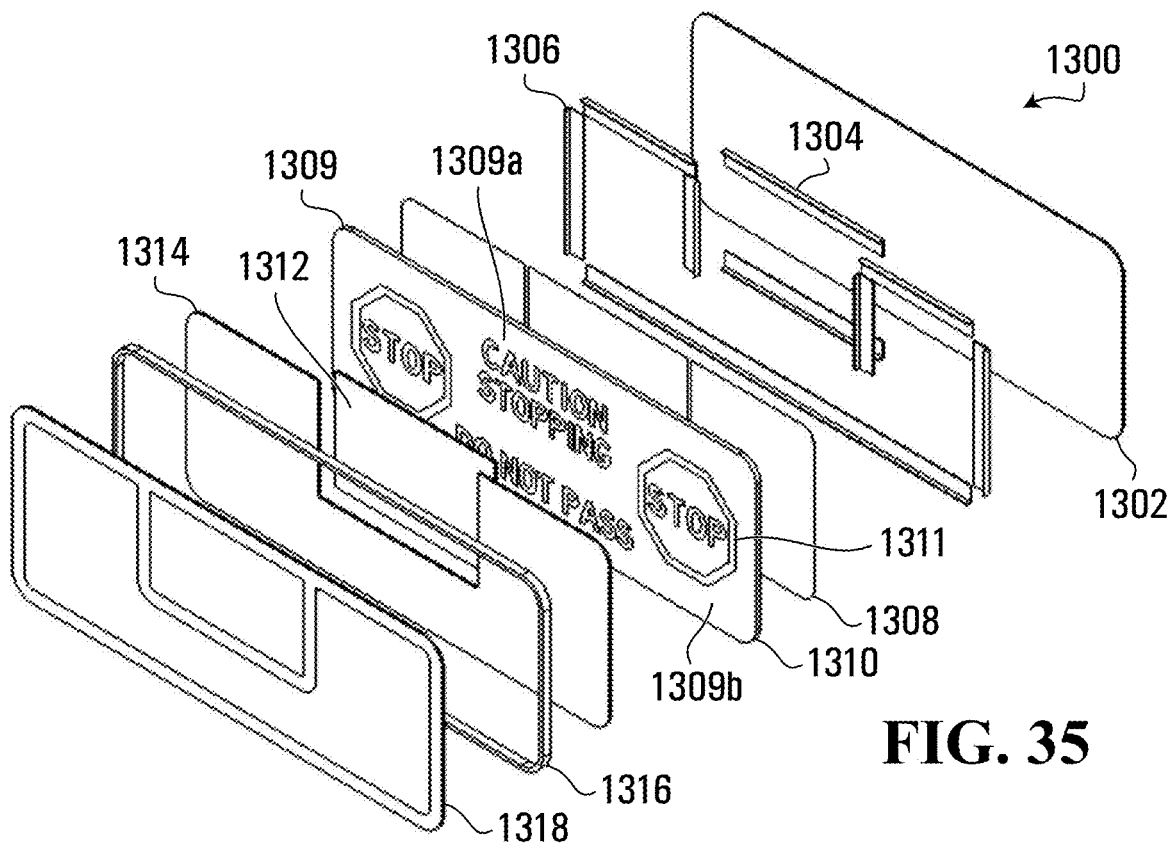
FIG. 35 is an exploded perspective view of a sign according to one embodiment of the present disclosure.

Referring to FIG. 35, in some embodiments, a sign 1300 may include a back panel 1302, first LED strips 1304, second LED strips 1306, reflective layer 1308, light diffusive plate 1310 with etched areas 1309 and non-etched areas 1311, first translucent lens 1312, second translucent lens 1314, a permiter seal 1316 and a clear front cover lens 1318. Only first LED strips 1304 may be activated when only the etched areas 1309a behind the first translucent lens 1312 are to be lit up. Similarly, only second LED strips 1306 may be activated when only the etched areas 1309b behind the second translucent lens 1314 are to be lit up. Moreover, first and second translucent lenses 1312, 1314 may be provided with the different colouring so as to create a different visual impression depending on which LED strips are activated. For example the first translucent lens 1312 overlayed on the words "CAUTION STOPPING" may have an orange tint while the second translucent lens 1314 overlaying the words "STOP" and "DO NOT PASS" may have a red tint.

It will be understood that through placing of LED strips, varying of the number and shape of translucent lenses and varying the etched areas of the diffusive plate, a wide variety of desired combinations of messages, colouring and lighting may be achieved, all of which are within the present disclosure.

Other locations for illuminated signs according to the present disclosure are also possible. For example, service vehicles, such as buses, often use a marking to indicate information such as, in the case of buses, their route #, bus #, or other bus specific indicia. Often, the indicia changes more frequently than is practical for painting or applying decals to the exterior of the vehicle. In some embodiments, a sign which mounts on the inside window of the vehicle is illuminated due to its visibility and ability to quickly modify the sign indicia.

Such an illuminated sign, for example, a route sign, may be comprised of three main components: a light source, a mounting frame and a replaceable lens.

Figure 36:
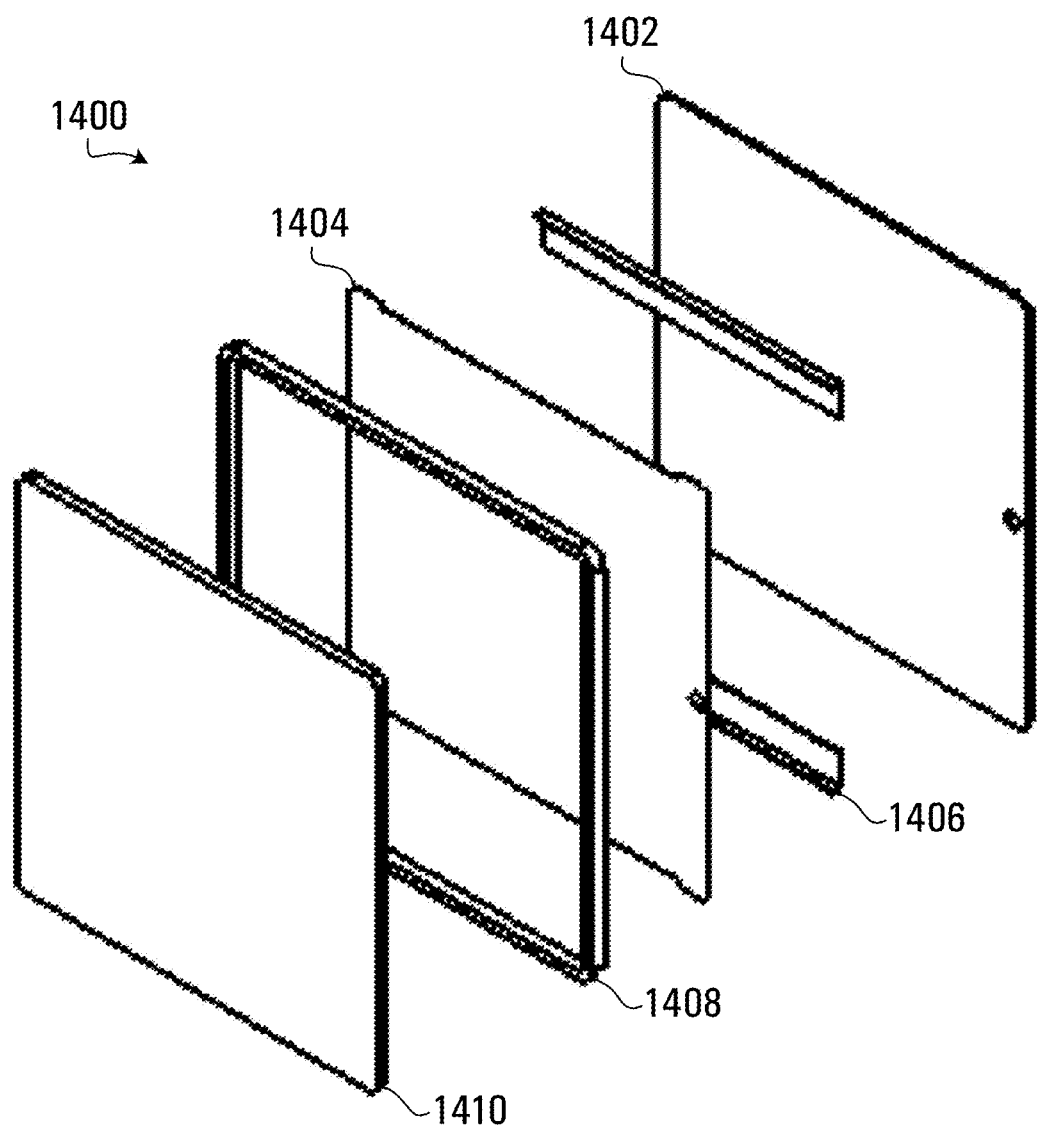
FIG. 36 is an exploded perspective view of a sign according to one embodiment of the present disclosure.

Referring to FIG. 36, in some embodiments, the light source 1400 comprises a back panel 1402, which acts as a protective cover on the back of the sign unit; a reflective layer 1404, which reflects the light from the back of the diffusive plate; LED strips 1406, which might be attached to aluminum substrate for better heat dissipation; a seal 1408 that protects internal components from water and dust ingress, and a diffusive plate 1410 that diffuses the light uniformly.

Such a light source 1400 may be combined with a mounting frame suitable for mounting to the interior or exterior of a vehicle. For example, in some embodiments, there is provided a frame that mounts to internal surfaces of the vehicle (side wall, panels, windows) for internal applications, or external surfaces of the vehicle for external applications.

Figure 37:
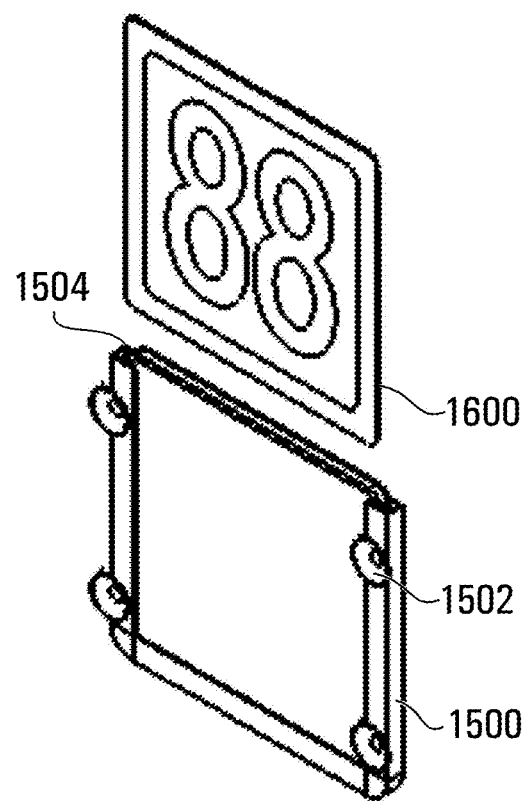
FIG. 37 is an exploded perspective view of a sign according to one embodiment of the present disclosure.

Referring to FIG. 37, in some embodiments, the mounting frame 1500 may be a frame for mounting on the internal or external surfaces of a vehicle window using suction cups 1502. Other embodiments that are within the present disclosure include a mounting frame that uses double side adhesive, glue, fasteners and other suitable mounting means.

The mounting frame 1500 is affixed to the light source 1400 and/or the light source 1400 is inserted into the pre-assembled frame 1500. The frame 1500 also includes a groove or channel 1504 that is dimensioned and sized to receive a replaceable lens 1600, which may have various background colors, indicia and other features to accommodate a variety of purposes, for example a route number, "School Bus" sign, "Activity Bus" sign etc. In the illustrated embodiment, the replaceable lens includes indicia indicating a route number of "88". The replaceable lens can be slid in or out of the groove 1504 to install and uninstall the lens, respectively.

In some embodiments, a self-contained illuminated sign is constructed similarly to the embodiment described above with respect to FIGS. 1 to 3, but the front panel is replaced with a transparent panel and an additional front lens with indicia attached to the transparent panel. Thus, referring to FIG. 38, a sign 1700 may include many or all of the same components as the sign 10 described above that make up a lighting section 1701 (i.e. a section that results in illumination), such as rear panel 14, sealing strip 38, reflective backing sheet 19, second adhesive tape strips 36, light dispersion panel 16, wiring 28, and first adhesive tape strips 34, but with the front panel being replaced with a transparent panel 1702 and an additional front lens 1704 with indicia attached to the transparent panel 1702, for example, using a transparent adhesive or other suitable means.

Figure 39:
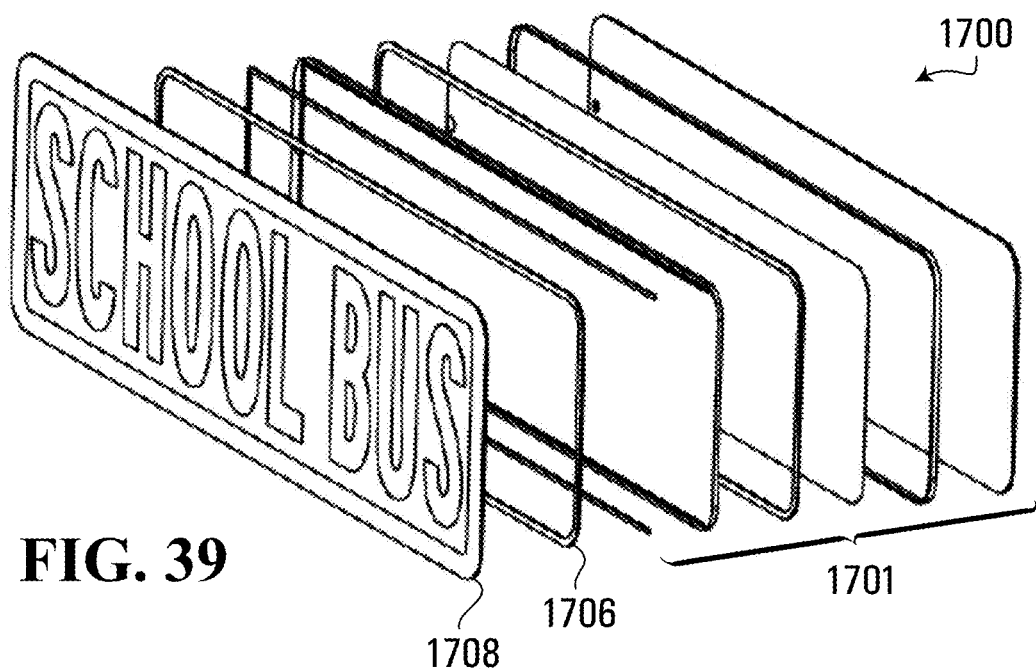
FIG. 39 is an exploded perspective view of a sign according to one embodiment of the present disclosure.

Referring to FIG. 39, in other embodiments, a front panel 1708, similar in construction to the front panel 12, but larger in size than the lighting section 1701, is adhered to the lighting section 1701. The front panel 1708 may not only be larger in size than front panel 12 and lighting section 1701 but also of a different shape or other configuration. The front panel 1708 may be affixed to the lighting section 1701 using adhesive tape 1706 or with other suitable means, such as a transparent adhesive. In some embodiments, the adhesive tape 1706 is considered to be part of the lighting section 1701.

Figure 38:
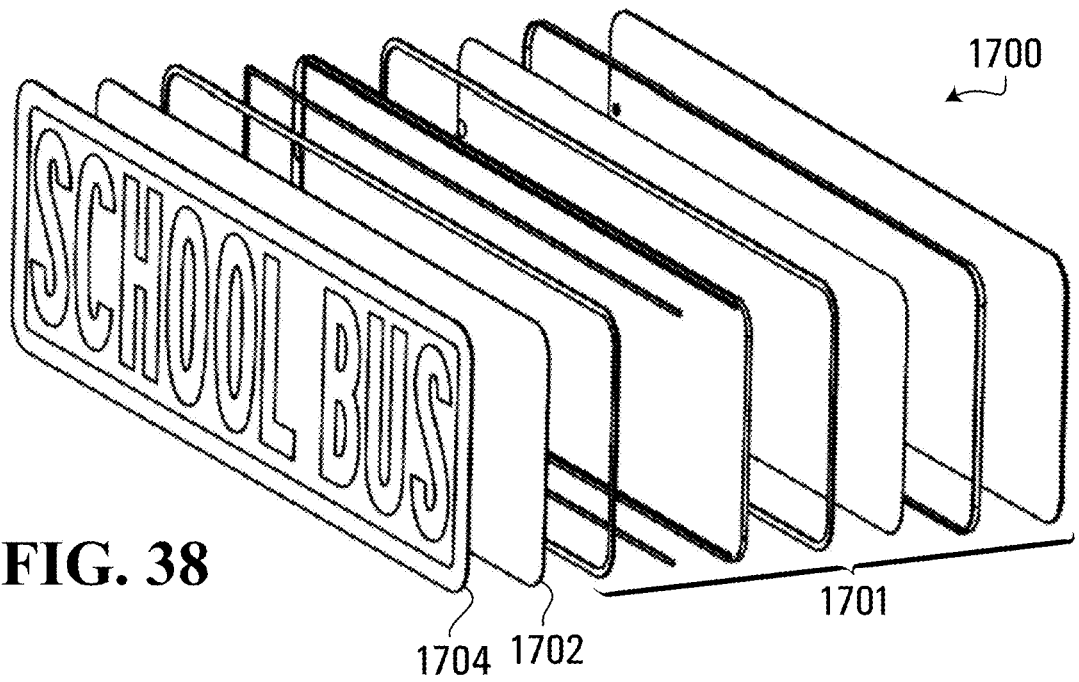
FIG. 38 is an exploded perspective view of a sign according to one embodiment of the present disclosure.
Figure 40:
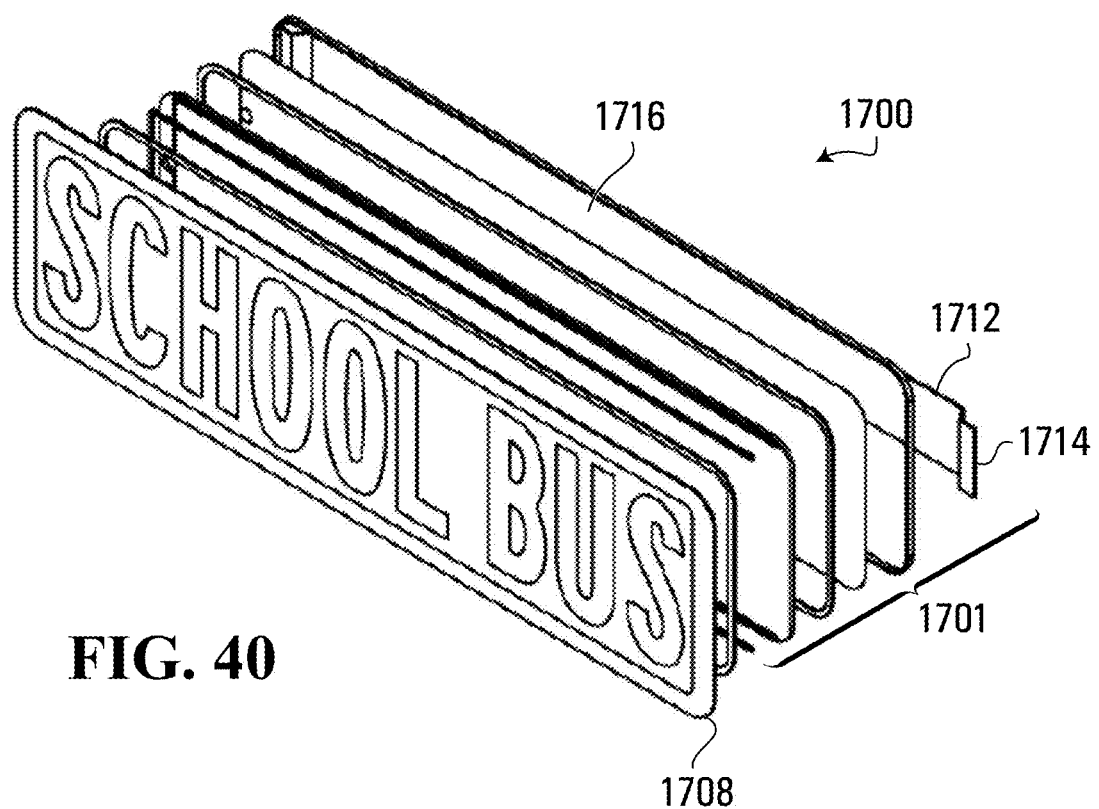
FIG. 40 is an exploded perspective view of a sign according to one embodiment of the present disclosure.

Both of the embodiments shown in FIGS. 38 and 39 may be installed and used with a suitable variation of the frame 50 as described in respect of FIGS. 4 to 6. However, the embodiments of FIGS. 38 and 39 may also be installed and used without a frame 50 and using other means. For example, referring to FIG. 40, the sign 1700 (according to either FIG. 38 or 39) may be installed using an intermediate bracket (not shown) to attach the lighting section 1701 to the vehicle, such as the bus. An additional rear, flexible bracket 1712 may be used to connect the lighting section 1701 to the front panel 1708 or the transparent panel 1702 with cover lens 1704 applied. Such a rear bracket 1712 extends widthwise beyond the edges of the lighting section 1701 with an extension 1714 that include adhesive or other suitable fastening methods for attaching to the front panel 1708 or transparent panel 1702. Similarly, adhesive or other suitable fastening means connect a backing portion 1716 of the rear bracket 1712 to the rear panel of the lighting section 1701.

In yet further embodiments, the front lens (i.e. a front panel such as front panel 1708 or translucent panel 1702 with lens 1704 applied) may be used in a vehicle but not directly attached to the lighting section. Thus, in some embodiments, the front lens and lighting section are each separately attached to the vehicle.

In yet further embodiments, the lighting section 1701 may not include a rear panel, such that the light dispersion panel is directly mounted to the shell of the vehicle. Such a connection may be made by any suitable means, such as adhesive, fastening, etc. One or more separate mounting bracket may also be used for mounting the light dispersion panel to the shell of the vehicle. Appropriate sealing and/or vibration reducing elements may be included between the light dispersion panel and the shell of the vehicle.

Figure 41:
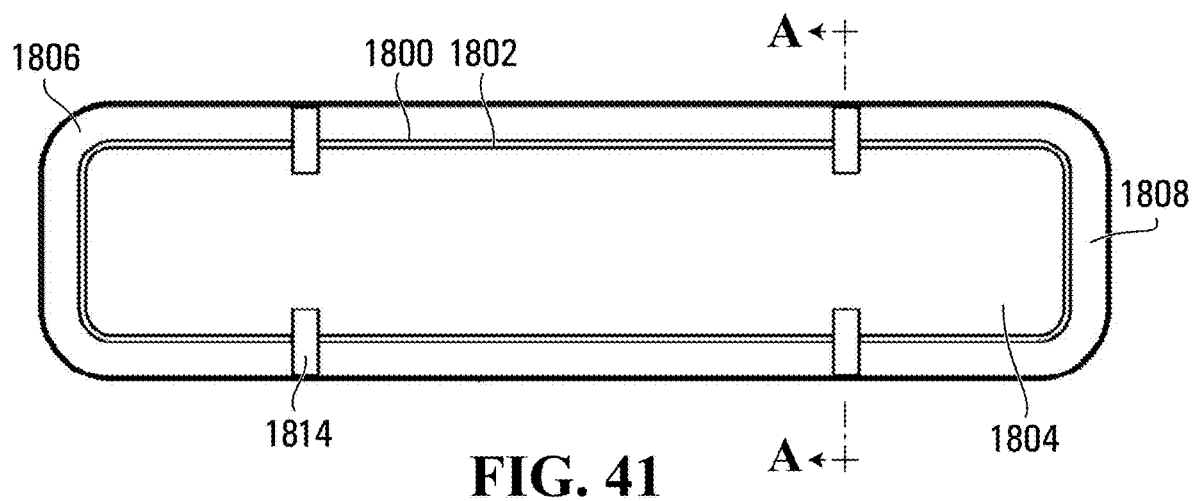
FIG. 41 is a front view of a sign according to one embodiment of the present disclosure installed in a vehicle.
Figure 42:
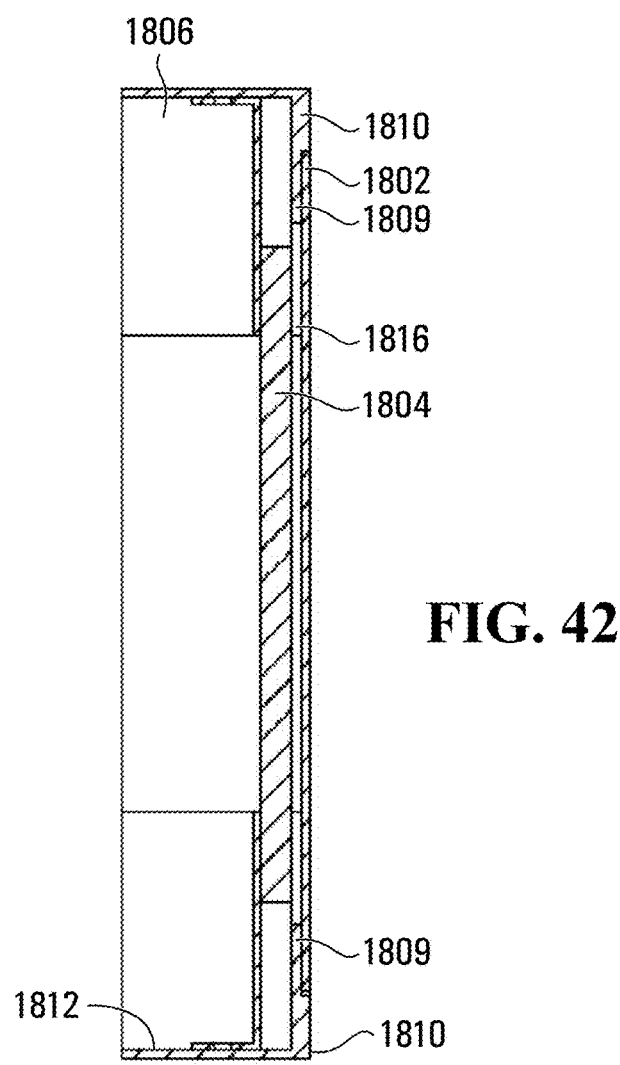
FIG. 42 is a cross-sectional view taken along line A-A in FIG. 41.

Referring to FIGS. 41 and 42, in some embodiments, a sign 1800 may be comprised of a separate front lens 1802 and a lighting section 1804, which are both separately installed in a cavity 1806 or a surface of a vehicle, such as a bus. In the illustrated embodiment, a gap 1808 is present between the front lens 1802 and lighting section 1804. The front lens 1802 is adhered or otherwise fastened to a jutting portion 1809 that juts from a front portion 1810 of the cavity 1806 that circumscribes the cavity 1806 and acts as a perimeter thereto. The lighting section 1804 may be connected to an interior surface 1812 of the cavity 1806 using a bracket 1814 with known or suitable fastening means. There may be one or more connection points between the lighting section 1804 and the cavity 1806. In the illustrated embodiment of FIG. 41, four such fastening points are shown. In some embodiments, an optional gap 1816 is present between the front lens 1802 and the lighting section 1804.

Referring to FIGS. 43 to 47, in some embodiments according to the present disclosure, there is provided an illuminated sign system 1900 that includes an illuminated sign, such as the illuminated sign 10 and a power regulator system 1902. The power regulator include a system of electronics that creates a regulated supply to power the multiple LEDs in the sign 10. This regulated supply allows for consistent illumination regardless of the electrical power supplied by the vehicle to which the the sign is mounted. Additionally, the protection of the regulated supply allows for an extended lifetime of the LEDs as they will be always powered within their optimum range. The application of this regulation also has the effect of a greater efficiency when the power supplied from the vehicle is greater than nominal.

In a typical automotive system the power supplied by the vehicle can have fluctuations which can cause adverse affects to LEDs. By regulating the power the LEDs are protected for damaging events that would drastically shorten their usable lifetime. The electronics are mounted in-line between the power supplied by the vehicle and the LEDs.

Figure 43:
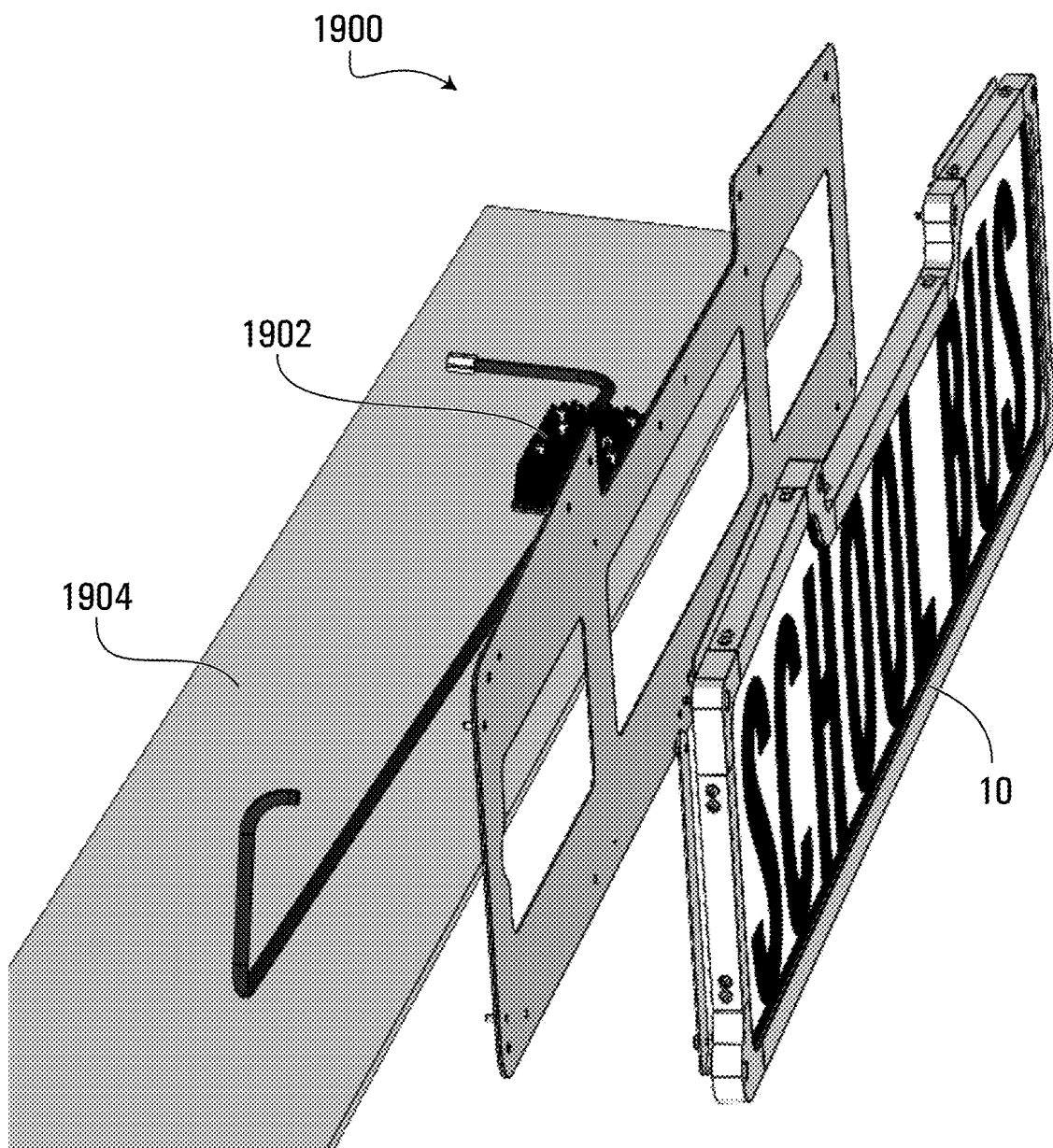
FIG. 43 is an exploded perspective view of an illuminated sign system according to one embodiment of the present disclosure.

While shown enclosed in a separate component (such as separate module 400) in FIG. 43, in some embodiments, the power regulator system 1902 could also be incorporated into the sign 10 in whole or in part. For example, the power regulator system may be installed, in whole or in part, between the front and rear panels of the sign 10. Some components of the power regulator system 1902 could be incorporated into the sign 10 while other components could be positioned on an interior of the vehicle or on an opposite side of the shell of the vehicle from the sign 10.

When positioned externally of the sign 10, the power regulator system 1902 is operatively connected to the sign 10 via, for example, cabling 1904 which is fed through one or more openings in the vehicle shell and sign 10, as described above.

The power regulator system 1902 provides a desired power to the sign for consistent illumination and is configured to accept fluctuating power from an electrical system of the vehicle and to output the desired power.

Figure 44:
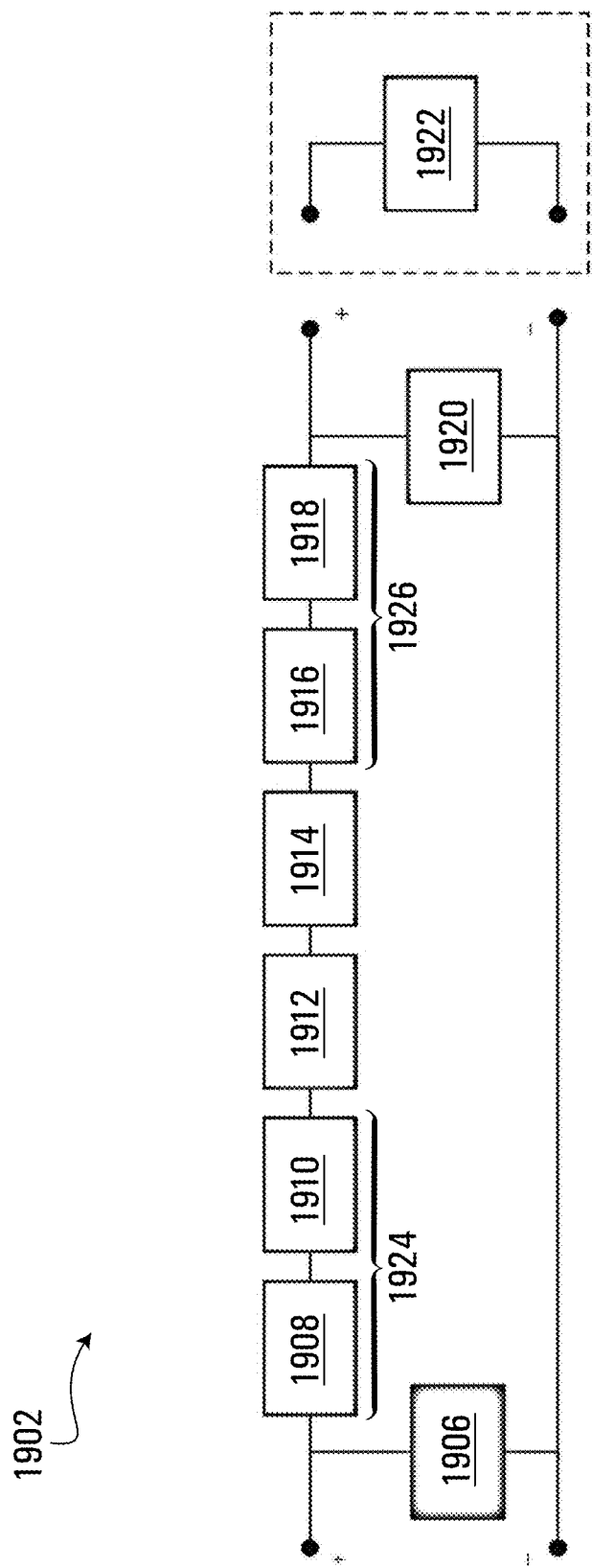
FIG. 44 is a diagram of a power regulator system according to one embodiment of the present disclosure.

Referring specifically FIG. 44, in some embodiments, the power regulator system 1902 incudes the following modules: first transient protection module 1906, first over/under voltage protection module 1908, first reverse voltage protection module 1910, voltage regulator 1912, short circuit protection module 1914, second over/under voltage protection module 1916, second reverse voltage protection module 1918, and second transient protection module 1920. The load 1922, e.g. the sign 10, is also shown in FIG. 44.

First over/under voltage protection module 1908 and first reverse voltage protection module 1910, as well as, in some embodiments, first transient protection module 1906, may be considered to be an input voltage protection module 1924, which is configured to protect against over voltage, under voltage and reverse voltage input to the voltage regulator 1912. Similarly, second over/under voltage protection module 1916 and second reverse voltage protection module 1918, as well as, in some embodiments, second transient protection module 1920, may be considered to be an output voltage protection module 1926, which is configured to protect against over voltage, under voltage and reverse voltage output to the sign 10.

Figure 45:
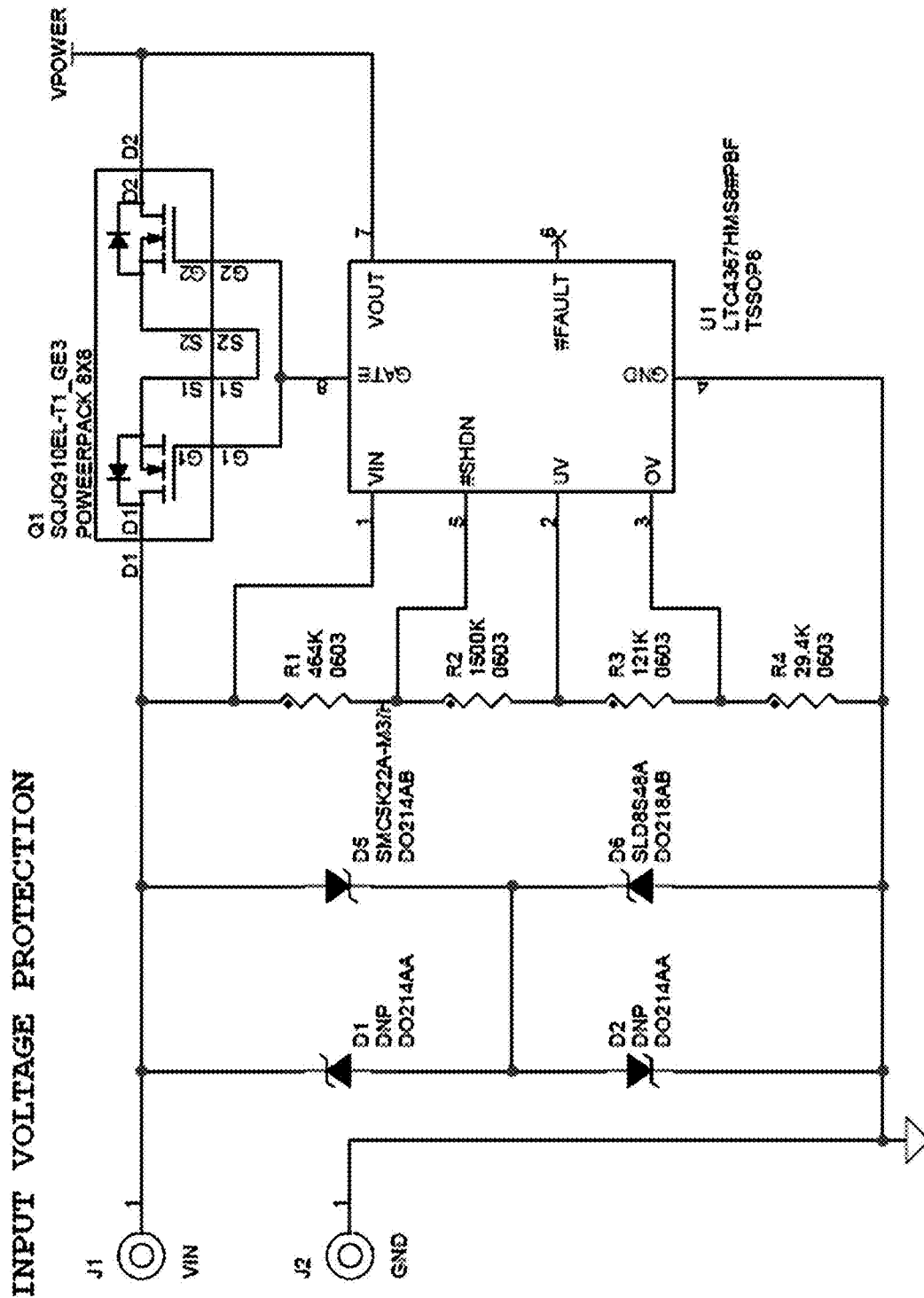
FIG. 45 is diagram of a module of a power regular system according to one embodiment of the present disclosure.
Figure 46:
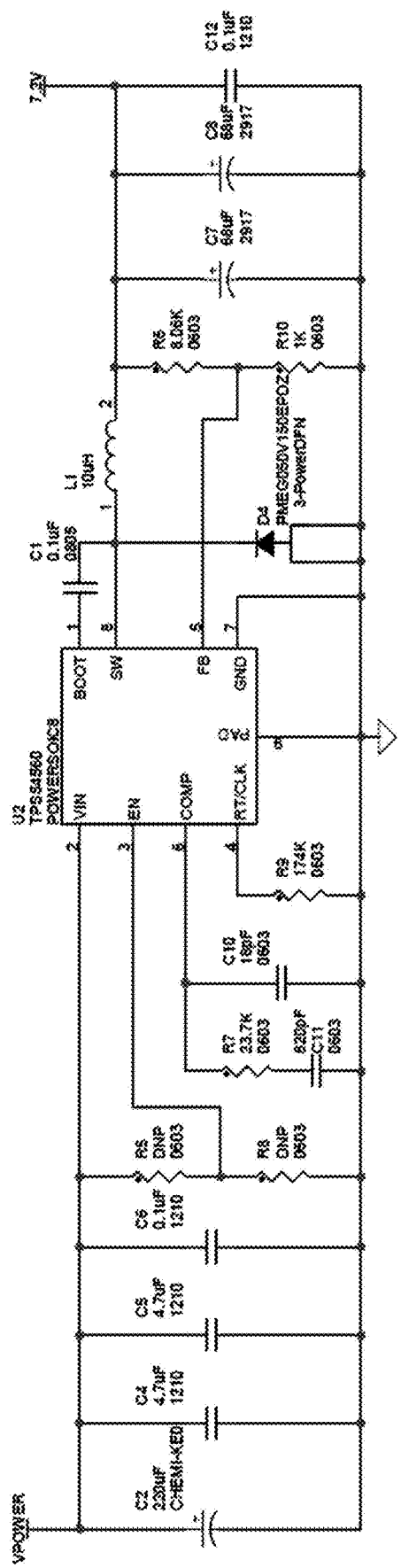
FIG. 46 is a diagram of a module of a power regular system according to one embodiment of the present disclosure.
Figure 47:
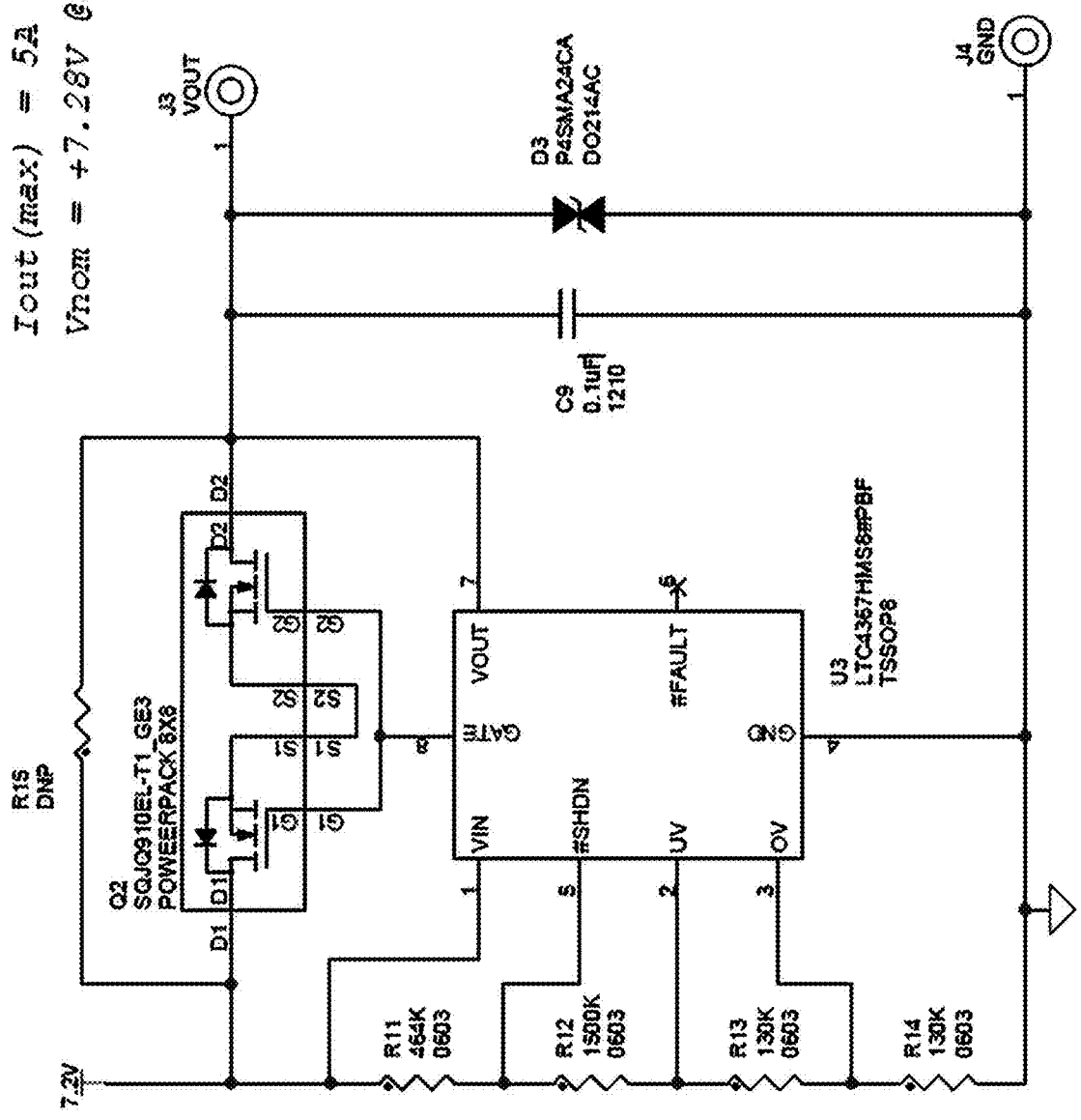
FIG. 47 is diagram of a module of a power regular system according to one embodiment of the present disclosure.

Example circuits for the input voltage protection module 1924, the voltage regulator 1912 and the output voltage protection module 1926 are shown in FIGS. 45 to 47, respectively.

In some embodiments, the power regulator system is configured to output 7.2V at 3.5 A. In embodiments where the illumination brightness of the sign is to be adjusted during operation, such as in embodiments where a photo sensor that detects ambient light aids in automatically controlling the brightness of the sign, the power regulator system may include a controller, or a controller may be combined with the power regulator system, to cause the power regulator system to output different voltage and/or current levels depending on the desired brightness of illumination.

Furthermore, while the illustrated embodiments show voltage regulation modules, it will be understood that the power regulator system may use current regulation modules and/or a combination of voltage and current regulation modules to regulate the power being supplied to the sign.

Figure 48:
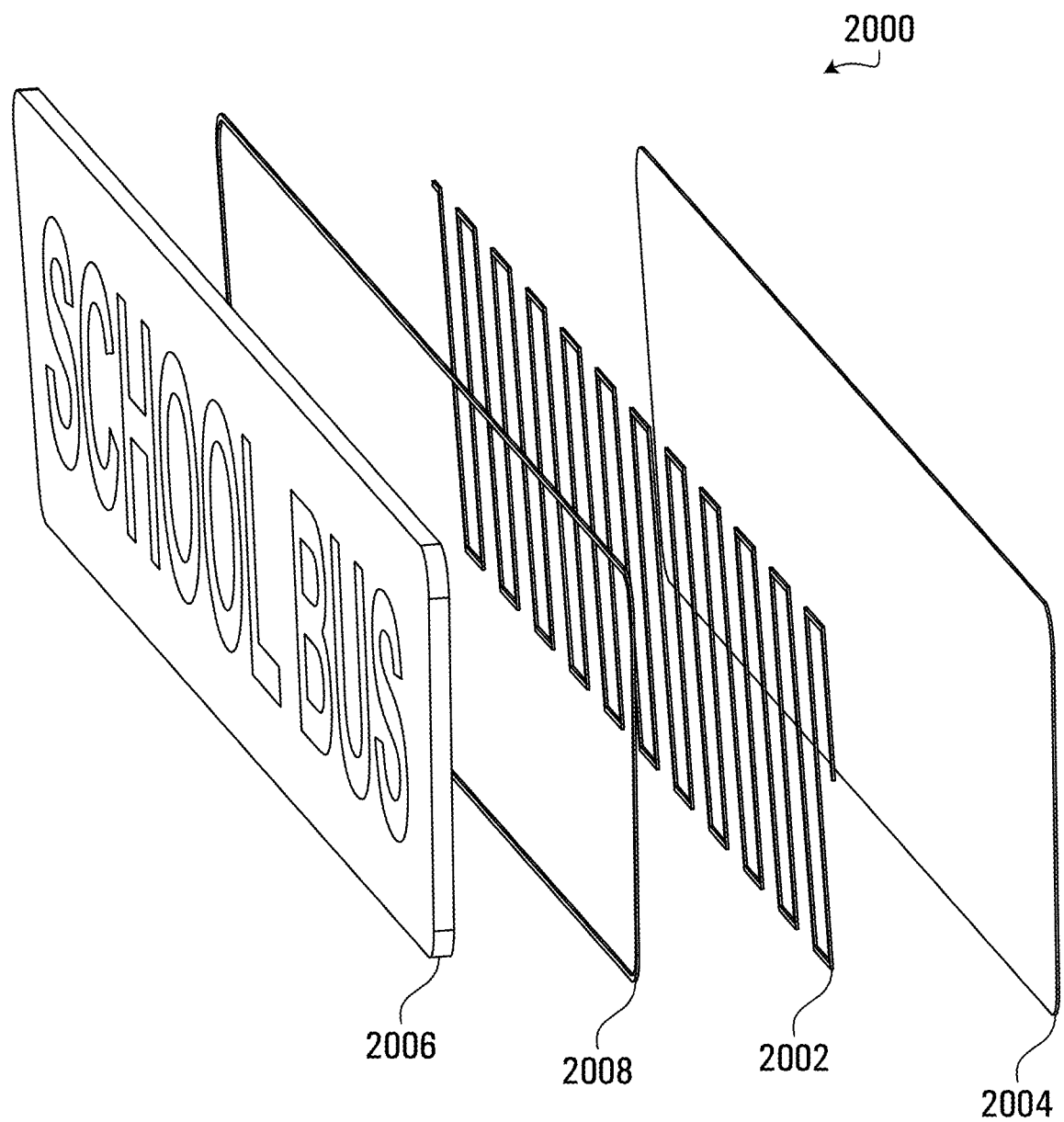
FIG. 48 is an exploded perspective view of a sign according to one embodiment of the present disclosure.

During intended use of the illuminated sign, weather conditions may result a buildup of snow and/or ice and/or condensation on the lens of the sign which impedes the visibility of the indicia. Referring to FIG. 48, in order to prevent and/or reduce this impediment, a sign 2000 may include a heating element 2002 in the construction of the sign. The heating element 2002 may be positioned between the rear panel 2004 and a front panel 2006. In the illustrated embodiment, the front panel is a combined front panel and light dispersion panel. The heating element 2002 may also be included in embodiments of the sign 2000 that do not include the rear panel and where the lighting section is mounted directly to a vehicle. Seal 2008 may be provided between the front panel 2006 and rear panel 2004 to seal the space therebetween.

Methods related to the above-discussed embodiments, such as methods of manufacturing, producing and/or providing a sign, an illumination source and/or a mounting frame are also within the present disclosure.

Other embodiments are also within the present disclosure.

In some embodiments, there is provided a self-contained illuminated school bus sign comprising:

a front panel defining a front display side of said sign;

a rear panel situated opposite the front panel in spaced relation therefrom to define a rear side of said sign;

an LED based light source that comprises a plurality of LEDs, is fully contained in a space between said front and rear panels, and is positioned to emit light from the sign through the front panel;

opaquely masked indicia areas on the front panel that are encompassed within a surrounding transparent or translucent area and that spell out "school bus", "activity bus" or other indicia representative of an intended use of said sign; and coloured material occupying or overlying the transparent or translucent areas of the front panel, whereby the front panel is backlit by the fully contained LED based light source to display the opaquely masked indicia in contrast with illumination of the surrounding transparent or translucent area.

In some embodiments, there is provided, in combination, a self-contained illuminated school bus sign and a separate mounting frame that is mountable on a shell of a bus and in which the self-contained illuminated school bus sign is selectively receivable to enable indirect mounting of the sign to the shell of the bus by attachment of the separate mounting frame thereto, said self-contained illuminated school bus sign comprising a front panel defining a front display side of said sign and an on-board light source supported independently of the bus and independently of the separate mounting frame in a backlighting position behind said front panel to emit light through said front panel in manner emphasizing indicia that are visible at the front side of said sign.

In some embodiments, there is provided a method of preparing school bus signs for use in different intended school bus applications, said method comprising:

having access to a plurality of prefabricated mounting frames that are configured for mounting to a bus shell and that share a matching configuration that is compatible with a standardized size and shape of sign;

according to a particular intended school bus application, either:
  (i) producing a particular self-contained illuminated school bus sign having particular indicia thereon dictated by said particular intended school bus application; or
  (ii) selecting a particular self-contained illuminated school bus sign from among a plurality of prefabricated self-contained illuminated school bus signs that share said standardized size and shape, but have different indicia thereon representative of said different intended school bus applications; and combining said particular sign with any one of said plurality of prefabricated mounting frames, whereby the combination of said particular sign with said any one of the plurality of prefabricated mounting frames creates an application-ready mountable sign product by which attachment of the mounting frame to the bus shell indirectly supports the particular sign thereon.

In some embodiments, there is provided a system for modular assembly of differently worded school bus signs for use in different intended school bus applications, said system comprising:

a plurality of self-contained illuminated school bus signs sharing a common size and shape, including at least a first group of signs having a first type of indicia thereon representative of a first type of intended application for said first group of signs, and a second group of signs having a differently worded second type of indicia thereon representative of a different second type of intended application for said second group of signs;

a plurality of mounting frames of matching configuration compatible with the common size and shape shared by the plurality of signs for selective receipt of any of said plurality of signs in any of said plurality of mounting frames, each mounting frame being configured for mounting to a bus shell;

whereby preparation of an installation-ready sign product for a particular bus application is achievable by selection of an appropriate sign from the different groups, and combination of the selected sign with any one of the mounting frames.

Since various modifications may be made to the embodiments of the present disclosure as herein described it is intended that all matter contained herein shall be interpreted as illustrative only and not in a limiting sense.

The invention claimed is:

1. An illuminated school bus sign for direct mounting on a school bus, the sign comprising:
  opaque lettering positioned on or over a front surface of a translucent panel;
  an opaque rear panel situated opposite to the translucent panel in spaced relation therefrom to define a space therebetween;
  a light source comprising a plurality of LEDs positioned in the space adjacent to the rear panel and pointing towards a front of the sign; and
  frame surrounding a perimeter of the translucent panel and forming a perimeter of the sign for mounting the sign to the school bus,
    wherein the translucent panel is spaced by a spacer from the LEDs thereby creating a gap between the LEDs and the translucent panel, wherein the spacer surrounds the LEDs and supports a rear surface of the translucent panel along the entire perimeter of the translucent panel, and wherein the entire perimeter of the translucent panel is sealed in a weather-tight manner by a weather-tight seal between the translucent panel and the spacer.

2. The sign of claim 1, wherein at least a portion of the translucent panel is retro-reflective.

3. The sign of claim 1, wherein the frame comprises one or more through holes for direct mounting the sign to the school bus.

4. The sign of claim 1, wherein a transparent layer extends over the lettering and the translucent panel.

5. The sign of claim 1, wherein the LEDs are arranged in rows.

6. The sign of claim 1, wherein the LEDs are mounted to the rear panel.

7. The sign of claim 1, wherein the LEDs emit light directly onto the translucent panel without any intervening layers.

8. The sign of claim 1, wherein the frame is a single piece.

9. The sign of claim 1, wherein the gap is sized to provide substantially uniform illumination emitted from the translucent panel.

10. The sign of claim 1, wherein the lettering spells the words SCHOOL BUS.

11. The sign of claim 1, wherein a contact between the translucent panel and the spacer is sealed in a weather-tight manner.

12. The sign of claim 1, wherein the translucent panel is adhered to the spacer.

13. The sign of claim 1, wherein the spacer is connected to the rear panel.

14. The sign of claim 1, wherein the spacer has a width parallel to the translucent panel and is positioned behind the perimeter of the translucent panel.

* * * * *